United States Patent
Sim-Tang

(10) Patent No.: US 8,712,970 B1
(45) Date of Patent: *Apr. 29, 2014

(54) RECOVERING A DATABASE TO ANY POINT-IN-TIME IN THE PAST WITH GUARANTEED DATA CONSISTENCY

(71) Applicant: Quest Software, Inc., Aliso Viejo, CA (US)

(72) Inventor: Siew Yong Sim-Tang, Saratoga, CA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,020

(22) Filed: Jan. 28, 2013

Related U.S. Application Data

(63) Continuation of application No. 12/099,837, filed on Apr. 9, 2008, now Pat. No. 8,364,648.

(60) Provisional application No. 60/910,718, filed on Apr. 9, 2007.

(51) Int. Cl.
*G06F 7/00* (2006.01)
*G06F 17/00* (2006.01)

(52) U.S. Cl.
USPC .......................................... 707/672

(58) Field of Classification Search
USPC .......................................... 707/674, 999.203
See application file for complete search history.

(56) References Cited

U.S. PATENT DOCUMENTS

| | | | |
|---|---|---|---|
| 3,555,184 A | 1/1971 | Townley |
| 3,555,195 A | 1/1971 | Rester et al. |
| 3,555,204 A | 1/1971 | Braun |
| 3,555,251 A | 1/1971 | Shavit |
| 3,648,250 A | 3/1972 | Low et al. |
| 4,162,536 A | 7/1979 | Morley |
| 4,402,045 A | 8/1983 | Krol |
| 4,415,792 A | 11/1983 | Jordan |
| 4,450,556 A | 5/1984 | Boleda et al. |
| 4,451,108 A | 5/1984 | Skidmore |
| 4,455,483 A | 6/1984 | Schonhuber |

(Continued)

FOREIGN PATENT DOCUMENTS

| | | |
|---|---|---|
| WO | WO 98/19262 | 5/1998 |
| WO | WO 02/25443 | 3/2002 |
| WO | WO 03/060774 | 7/2003 |

OTHER PUBLICATIONS

U.S. Appl. No. 12/099,837, filed Apr. 9, 2008, Sim-Tang, Siew Yong.

(Continued)

*Primary Examiner* — Aleksandr Kerzhner
(74) *Attorney, Agent, or Firm* — Winstead PC

(57) ABSTRACT

A data management method wherein a real-time history of a database system is stored as a logical representation and the logical representation is then used for any point-in-time recovery of the database system. More specifically, a method for capturing transaction data, binary data changes, metadata, and events, and for tracking a real-time history of a database system according to the events. The method enables tracking and storing of consistent checkpoint images of the database system, and also enables tracking of transaction activities between checkpoints. The database system may be recovered to any consistent checkpoint or to any point between two checkpoints.

15 Claims, 21 Drawing Sheets

(56) References Cited

U.S. PATENT DOCUMENTS

| | | |
|---|---|---|
| 4,502,082 A | 2/1985 | Ragle et al. |
| 4,512,020 A | 4/1985 | Krol et al. |
| 4,796,260 A | 1/1989 | Schilling et al. |
| 4,882,737 A | 11/1989 | Dzung |
| 4,916,450 A | 4/1990 | Davis |
| 4,972,474 A | 11/1990 | Sabin |
| 5,005,197 A | 4/1991 | Parsons et al. |
| 5,148,479 A | 9/1992 | Bird et al. |
| 5,177,796 A | 1/1993 | Feig et al. |
| 5,224,212 A | 6/1993 | Rosenthal et al. |
| 5,274,508 A | 12/1993 | Tan et al. |
| 5,280,584 A | 1/1994 | Caesar et al. |
| 5,287,504 A | 2/1994 | Carpenter et al. |
| 5,303,393 A | 4/1994 | Noreen et al. |
| 5,305,326 A | 4/1994 | Solomon et al. |
| 5,311,197 A | 5/1994 | Sorden et al. |
| 5,319,395 A | 6/1994 | Larky et al. |
| 5,321,699 A | 6/1994 | Endoh et al. |
| 5,363,371 A | 11/1994 | Roy et al. |
| 5,365,516 A | 11/1994 | Jandrell |
| 5,373,372 A | 12/1994 | Loewen |
| 5,377,102 A | 12/1994 | Nishiishigaki |
| 5,382,508 A | 1/1995 | Ikenoue |
| 5,386,422 A | 1/1995 | Endoh et al. |
| 5,387,994 A | 2/1995 | McCormack et al. |
| 5,388,074 A | 2/1995 | Buckenmaier |
| 5,392,209 A | 2/1995 | Eason et al. |
| 5,396,600 A | 3/1995 | Thompson et al. |
| 5,416,831 A | 5/1995 | Chewning, III et al. |
| 5,424,778 A | 6/1995 | Sugiyama et al. |
| 5,430,830 A | 7/1995 | Frank et al. |
| 5,440,686 A | 8/1995 | Dahman et al. |
| 5,469,444 A | 11/1995 | Endoh et al. |
| 5,477,492 A | 12/1995 | Ohsaki et al. |
| 5,479,654 A | 12/1995 | Squibb |
| 5,481,531 A | 1/1996 | Yamamuro |
| 5,499,512 A | 3/1996 | Jurewicz et al. |
| 5,502,491 A | 3/1996 | Sugiyama et al. |
| 5,506,965 A | 4/1996 | Naoe |
| 5,507,024 A | 4/1996 | Richards, Jr. |
| 5,511,212 A | 4/1996 | Rockoff |
| 5,526,357 A | 6/1996 | Jandrell |
| 5,537,945 A | 7/1996 | Sugihara et al. |
| 5,560,033 A | 9/1996 | Doherty et al. |
| 5,561,671 A | 10/1996 | Akiyama |
| 5,583,975 A | 12/1996 | Naka et al. |
| 5,602,638 A | 2/1997 | Boulware |
| 5,606,601 A | 2/1997 | Witzman et al. |
| 5,640,159 A | 6/1997 | Furlan et al. |
| 5,644,763 A | 7/1997 | Roy |
| 5,651,129 A | 7/1997 | Yokote et al. |
| 5,657,398 A | 8/1997 | Guilak |
| 5,678,042 A | 10/1997 | Pisello et al. |
| 5,684,536 A | 11/1997 | Sugiyama et al. |
| 5,684,693 A | 11/1997 | Li |
| 5,684,774 A | 11/1997 | Yamamuro |
| 5,724,241 A | 3/1998 | Wood et al. |
| 5,729,743 A | 3/1998 | Squibb |
| 5,737,399 A | 4/1998 | Witzman et al. |
| 5,742,509 A | 4/1998 | Goldberg et al. |
| 5,742,915 A | 4/1998 | Stafford |
| 5,754,772 A | 5/1998 | Leaf |
| 5,764,691 A | 6/1998 | Hennedy et al. |
| 5,768,159 A | 6/1998 | Belkadi et al. |
| 5,778,370 A | 7/1998 | Emerson |
| 5,781,612 A | 7/1998 | Choi et al. |
| 5,784,366 A | 7/1998 | Apelewicz |
| 5,794,252 A | 8/1998 | Bailey et al. |
| 5,805,155 A | 9/1998 | Allibhoy et al. |
| 5,812,130 A | 9/1998 | Van Huben et al. |
| RE35,920 E | 10/1998 | Sorden et al. |
| 5,819,020 A | 10/1998 | Beeler, Jr. |
| 5,822,749 A | 10/1998 | Agarwal |
| 5,826,265 A | 10/1998 | Van Huben et al. |
| 5,831,903 A | 11/1998 | Ohuchi et al. |
| 5,841,717 A | 11/1998 | Yamaguchi |
| 5,841,771 A | 11/1998 | Irwin et al. |
| 5,848,072 A | 12/1998 | Prill et al. |
| 5,854,834 A | 12/1998 | Gottlieb et al. |
| 5,862,136 A | 1/1999 | Irwin |
| 5,864,875 A | 1/1999 | Van Huben et al. |
| 5,877,742 A | 3/1999 | Klink |
| 5,878,408 A | 3/1999 | Van Huben et al. |
| 5,893,119 A | 4/1999 | Squibb |
| 5,894,494 A | 4/1999 | Davidovici |
| 5,909,435 A | 6/1999 | Apelewicz |
| 5,915,251 A | 6/1999 | Burrows et al. |
| 5,917,429 A | 6/1999 | Otis et al. |
| 5,918,248 A | 6/1999 | Newell et al. |
| 5,920,867 A | 7/1999 | Van Huben et al. |
| 5,920,873 A | 7/1999 | Van Huben et al. |
| 5,928,327 A | 7/1999 | Wang et al. |
| 5,930,732 A | 7/1999 | Domanik et al. |
| 5,930,762 A | 7/1999 | Masch |
| 5,931,928 A | 8/1999 | Brennan et al. |
| 5,937,168 A | 8/1999 | Anderson et al. |
| 5,940,823 A | 8/1999 | Schreiber et al. |
| 5,950,201 A | 9/1999 | Van Huben et al. |
| 5,953,729 A | 9/1999 | Cabrera et al. |
| 5,958,010 A | 9/1999 | Agarwal et al. |
| 5,966,707 A | 10/1999 | Van Huben et al. |
| 5,974,563 A | 10/1999 | Beeler, Jr. |
| 5,980,096 A | 11/1999 | Thalhammer-Reyero |
| 5,999,562 A | 12/1999 | Hennedy et al. |
| 6,005,846 A | 12/1999 | Best et al. |
| 6,005,860 A | 12/1999 | Anderson et al. |
| 6,031,848 A | 2/2000 | Brennan |
| 6,035,297 A | 3/2000 | Van Huben et al. |
| 6,047,323 A | 4/2000 | Krause |
| 6,065,018 A * | 5/2000 | Beier et al. ............... 707/610 |
| 6,072,185 A | 6/2000 | Arai et al. |
| 6,088,693 A | 7/2000 | Van Huben et al. |
| 6,094,654 A | 7/2000 | Van Huben et al. |
| 6,108,318 A | 8/2000 | Kolev et al. |
| 6,108,410 A | 8/2000 | Reding et al. |
| 6,154,847 A | 11/2000 | Schofield et al. |
| 6,158,019 A | 12/2000 | Squibb |
| 6,163,856 A | 12/2000 | Dion et al. |
| 6,178,121 B1 | 1/2001 | Maruyama |
| 6,181,609 B1 | 1/2001 | Muraoka |
| 6,189,016 B1 | 2/2001 | Cabrera et al. |
| 6,237,122 B1 | 5/2001 | Maki |
| 6,243,348 B1 | 6/2001 | Goodberlet |
| 6,249,824 B1 | 6/2001 | Henrichs |
| 6,366,926 B1 | 4/2002 | Pohlmann et al. |
| 6,366,988 B1 | 4/2002 | Skiba et al. |
| 6,389,427 B1 | 5/2002 | Faulkner |
| 6,393,582 B1 | 5/2002 | Klecka et al. |
| 6,397,242 B1 | 5/2002 | Devine et al. |
| 6,446,136 B1 | 9/2002 | Pohlmann et al. |
| 6,460,055 B1 | 10/2002 | Midgley et al. |
| 6,463,565 B1 | 10/2002 | Kelly et al. |
| 6,487,561 B1 | 11/2002 | Ofek et al. |
| 6,487,581 B1 | 11/2002 | Spence et al. |
| 6,496,944 B1 | 12/2002 | Hsiao et al. |
| 6,502,133 B1 | 12/2002 | Baulier et al. |
| 6,519,612 B1 | 2/2003 | Howard et al. |
| 6,526,418 B1 | 2/2003 | Midgley et al. |
| 6,549,916 B1 | 4/2003 | Sedlar |
| 6,611,867 B1 | 8/2003 | Bowman-Amuah |
| 6,625,623 B1 | 9/2003 | Midgley et al. |
| 6,629,109 B1 | 9/2003 | Koshisaka |
| 6,640,145 B2 | 10/2003 | Hoffberg et al. |
| 6,670,974 B1 | 12/2003 | McKnight et al. |
| RE38,410 E | 1/2004 | Hersch et al. |
| 6,751,753 B2 | 6/2004 | Nguyen et al. |
| 6,769,074 B2 | 7/2004 | Vaitzblit |

(56) References Cited

U.S. PATENT DOCUMENTS

| | | |
|---|---|---|
| 6,779,003 B1 | 8/2004 | Midgley et al. |
| 6,785,786 B1 | 8/2004 | Gold et al. |
| 6,807,550 B1 | 10/2004 | Li et al. |
| 6,816,872 B1 | 11/2004 | Squibb |
| 6,823,336 B1 | 11/2004 | Srinivasan et al. |
| 6,826,711 B2 | 11/2004 | Moulton et al. |
| 6,836,756 B1 | 12/2004 | Gruber |
| 6,839,721 B2 | 1/2005 | Schwols |
| 6,839,740 B1 | 1/2005 | Kiselev |
| 6,847,984 B1 | 1/2005 | Midgley et al. |
| 6,907,551 B2 | 6/2005 | Katagiri et al. |
| 6,941,310 B2 | 9/2005 | Ahad et al. |
| 6,968,464 B2 | 11/2005 | Gardiner et al. |
| 6,983,286 B1 | 1/2006 | Sinha et al. |
| 6,993,706 B2 | 1/2006 | Cook |
| 7,003,688 B1 | 2/2006 | Pittelkow et al. |
| 7,028,078 B1 | 4/2006 | Sharma et al. |
| 7,039,663 B1 | 5/2006 | Federwisch et al. |
| 7,054,913 B1 | 5/2006 | Kiselev |
| 7,069,579 B2 | 6/2006 | Delpuch |
| 7,080,081 B2 | 7/2006 | Agarwal et al. |
| 7,092,396 B2 | 8/2006 | Lee et al. |
| 7,096,392 B2 | 8/2006 | Sim-Tang |
| 7,200,233 B1 | 4/2007 | Keller et al. |
| 7,206,805 B1 | 4/2007 | McLaughlin |
| 7,207,224 B2 | 4/2007 | Rutt et al. |
| 7,272,613 B2 | 9/2007 | Sim et al. |
| 7,290,056 B1 | 10/2007 | McLaughlin |
| 7,325,159 B2 | 1/2008 | Stager et al. |
| 7,363,549 B2 | 4/2008 | Sim-Tang et al. |
| 7,519,870 B1 | 4/2009 | Sim-Tang et al. |
| 7,526,541 B2 | 4/2009 | Roese et al. |
| 7,565,661 B2 | 7/2009 | Sim-Tang |
| 7,680,834 B1 | 3/2010 | Sim-Tang et al. |
| 7,689,602 B1 | 3/2010 | Sim-Tang et al. |
| 7,788,521 B1 | 8/2010 | Sim-Tang et al. |
| 7,904,913 B2 | 3/2011 | Sim-Tang et al. |
| 7,979,404 B2 | 7/2011 | Sim-Tang |
| 7,979,441 B2 | 7/2011 | Sim-Tang |
| 8,060,889 B2 | 11/2011 | Sim-Tang et al. |
| 8,094,647 B2 | 1/2012 | Elliott et al. |
| 8,108,429 B2 | 1/2012 | Sim-Tang et al. |
| 8,131,723 B2 | 3/2012 | Sim-Tang |
| 8,151,140 B2 | 4/2012 | Sim-Tang et al. |
| 8,195,628 B2 | 6/2012 | Sim-Tang et al. |
| 8,200,706 B1 | 6/2012 | Sim-Tang et al. |
| 8,364,648 B1 | 1/2013 | Sim-Tang |
| 8,365,017 B2 | 1/2013 | Sim-Tang |
| 8,375,248 B2 | 2/2013 | Sim-Tang |
| 2001/0029520 A1 | 10/2001 | Miyazaki et al. |
| 2001/0043522 A1 | 11/2001 | Park |
| 2001/0056362 A1 | 12/2001 | Hanagan et al. |
| 2002/0022982 A1 | 2/2002 | Cooperstone et al. |
| 2002/0064149 A1 | 5/2002 | Elliott et al. |
| 2002/0091722 A1 | 7/2002 | Gupta et al. |
| 2002/0107860 A1 | 8/2002 | Gobeille et al. |
| 2002/0144177 A1 | 10/2002 | Kondo et al. |
| 2002/0147807 A1 | 10/2002 | Raguseo |
| 2002/0172222 A1 | 11/2002 | Ullmann et al. |
| 2002/0178397 A1 | 11/2002 | Ueno et al. |
| 2002/0199152 A1 | 12/2002 | Garney et al. |
| 2003/0004947 A1 | 1/2003 | Coverston |
| 2003/0009552 A1 | 1/2003 | Benfield et al. |
| 2003/0051026 A1 | 3/2003 | Carter et al. |
| 2003/0088372 A1 | 5/2003 | Caulfield |
| 2003/0117916 A1 | 6/2003 | Makela et al. |
| 2003/0200098 A1 | 10/2003 | Geipel et al. |
| 2003/0204515 A1 | 10/2003 | Shadmon et al. |
| 2003/0225825 A1 | 12/2003 | Healey et al. |
| 2004/0010544 A1 | 1/2004 | Slater et al. |
| 2004/0036716 A1 | 2/2004 | Jordahl |
| 2004/0047354 A1 | 3/2004 | Slater et al. |
| 2004/0080504 A1 | 4/2004 | Salesky et al. |
| 2004/0098458 A1 | 5/2004 | Husain et al. |
| 2004/0098717 A1 | 5/2004 | Husain et al. |
| 2004/0098728 A1 | 5/2004 | Husain et al. |
| 2004/0098729 A1 | 5/2004 | Husain et al. |
| 2004/0117715 A1 | 6/2004 | Ha et al. |
| 2004/0133487 A1 | 7/2004 | Hanagan et al. |
| 2004/0193594 A1 | 9/2004 | Moore et al. |
| 2004/0199486 A1 | 10/2004 | Gopinath et al. |
| 2004/0250212 A1 | 12/2004 | Fish |
| 2005/0001911 A1 | 1/2005 | Suzuki |
| 2005/0021690 A1 | 1/2005 | Peddada |
| 2005/0076066 A1 | 4/2005 | Stakutis et al. |
| 2005/0166179 A1 | 7/2005 | Vronay et al. |
| 2005/0240592 A1 | 10/2005 | Mamou et al. |
| 2005/0251540 A1 | 11/2005 | Sim-Tang |
| 2005/0262097 A1 | 11/2005 | Sim-Tang et al. |
| 2005/0262188 A1 | 11/2005 | Mamou et al. |
| 2005/0286440 A1 | 12/2005 | Strutt et al. |
| 2006/0020586 A1 | 1/2006 | Prompt et al. |
| 2006/0026220 A1 | 2/2006 | Margolus |
| 2006/0050970 A1 | 3/2006 | Gunatilake |
| 2006/0101384 A1 | 5/2006 | Sim-Tang et al. |
| 2006/0130002 A1 | 6/2006 | Hirayama et al. |
| 2006/0137024 A1 | 6/2006 | Kim et al. |
| 2006/0236149 A1 | 10/2006 | Nguyen et al. |
| 2006/0259820 A1 | 11/2006 | Swoboda |
| 2006/0278004 A1 | 12/2006 | Rutt et al. |
| 2007/0067278 A1 | 3/2007 | Borodziewicz et al. |
| 2007/0094312 A1 | 4/2007 | Sim-Tang |
| 2007/0168692 A1 | 7/2007 | Quintiliano |
| 2007/0185922 A1* | 8/2007 | Kapoor et al. ............... 707/202 |
| 2007/0214191 A1 | 9/2007 | Chandrasekaran |
| 2010/0198788 A1 | 8/2010 | Sim-Tang |
| 2011/0252004 A1 | 10/2011 | Sim-Tang |
| 2011/0252432 A1 | 10/2011 | Sim-Tang et al. |
| 2012/0254659 A1 | 10/2012 | Sim-Tang et al. |
| 2012/0266019 A1 | 10/2012 | Sim-Tang et al. |
| 2012/0284238 A1 | 11/2012 | Sim-Tang et al. |

OTHER PUBLICATIONS

U.S. Appl. No. 13/242,916, filed Sep. 23, 2011, Sim-Tang, Siew Yong.

U.S. Appl. No. 13/489,751, filed Jun. 6, 2012, Sim-Tang, Siew Yong.

Bloom, Burton H., Space/Time Trade-offs in Hash Coding with Allowable Errors, Communications of the ACM, vol. 13, No. 7, Jul. 1970, pp. 422-426.

Housel, et al., "WebExpress: A client/intercept based system for optimizing Web browsing in a wireless environment", Mobile Network and Applications, vol. 3, pp. 419-431, 1998, Baltzer Science Publishers.

International Preliminary Report and Written Opinion for PCT/US05/15651 (Beausoliel, Rob) mailed Sep. 29, 2005 (13 pages).

International Preliminary Report and Written Opinion for PCT/US05/15653 (Zhen, Li B.) mailed Nov. 30, 2006 (13 pages).

International Preliminary Report and Written Opinion for PCT/US05/15662 (Vo, Tim) mailed Feb. 1, 2008 (11 pages).

International Preliminary Report and Written Opinion for PCT/US05/32958 (Abel-Jalil, Neveen) mailed Jul. 8, 2008 (8 pages).

International Preliminary Report and Written Opinion for PCT/US05/39709 (Thomson, William) mailed Oct. 16, 2007 (7 pages).

International Search Report for PCT/US05/15651 (Beausoliel, Rob) mailed Sep. 29, 2005 (1 page).

International Search Report for PCT/US05/15653 (Zhen, Li B.) mailed Nov. 30, 2006 (3 pages).

International Search Report for PCT/US05/15662 (Vo, Tim) mailed Feb. 1, 2008 (2 pages).

International Search Report for PCT/US05/32958 (Abel-Jalil, Neveen) mailed Jul. 8, 2008 (1 page).

International Search Report for PCT/US05/39709 (Thomson, William) mailed Oct. 16, 2007 (1 page).

Microsoft Windows Storage Server 2003, NSI Software, "Improving Business Continuity Using Windows Storage Server 2003", White Paper, Oct. 2003, pp. 1-15.

(56) References Cited

OTHER PUBLICATIONS

Plagemann, Thomas, Towards Middleware Services for Mobile ADHOC Network Applications, May 2003, IEEE (FTDCS'03), pp. 1-7.

Psounis, "Class-based Delta-encoding: A Scalable Scheme for Caching Dynamic Web Content", Proceedings of the 22nd International Conference on Distributed Computing Systems Workshops, 2002 IEEE (pp. 1-7).

U.S. Appl. No. 13/721,588, Sim-Tang

Reichenberger, "Delta Storage for Arbitrary Non-Text Files", SCM '91 Proceedings of the $3^{rd}$ international workshop on Software configuration management, pp. 144-152, ACM 1991.

Otlu, "A New Technique: Replace Algorithm to Retrieve a Version from a Repository Instead of Delta Application", Thesis, The Graduate School of Natural and Applied Sciences, The Middle East Technical University, Apr. 2004.

Kurtz et al., "Delta Comprehension Algorithms for Diverse Environments", 2006, 8 pages.

U.S. Appl. No. 13/714,829, Sim-Tang.

\* cited by examiner

DATA STRUCTURE OF A SIMPLE OBJECT INSTANCE

RECOVERING A DATABASE TO ANY POINT-IN-TIME IN THE PAST WITH GUARANTEED DATA CONSISTENCY

This patent application is a continuation of U.S. patent application Ser. No. 12/099,837, now U.S. Pat. No. 8,364,648, filed Apr. 9, 2008. U.S. patent application Ser. No. 12/099,837 is based on and claims priority to Ser. No. 60/910,718, filed Apr. 9, 2007. This application incorporates by reference the entire disclosure of U.S. patent application Ser. No. 12/099,837.

RELATED APPLICATIONS

This patent application is related to the following commonly-owned applications:

Ser. No. 10/841,398, filed May 7, 2004, titled "Method and system for automated, no downtime, real-time, continuous data protection,"

Ser. No. 10/842,286, filed May 10, 2004, titled "Method and system for real-time event journaling to provide enterprise data services,"

Ser. No. 10/863,117, filed Jun. 8, 2004, titled "Method and system for no downtime, real-time, continuous data protection,"

Ser. No. 10/862,971, filed Jun. 8, 2004, titled "Method and system for no downtime, resynchronization for real-time, continuous data protection,"

Ser. No. 11/185,313, filed Jul. 20, 2005, titled "Method and system for virtual on-demand recovery for real-time, continuous data protection,"

Ser. No. 11/123,994, filed May 6, 2005, titled "Method and system for moving real-time data events across a plurality of devices to in a network for simultaneous data protection, replication and access services,"

Ser. No. 10/943,541, filed Sep. 17, 2004, titled "Method and system for data protection," and Ser. No. 11/638,253, filed Apr. 26, 2007, titled "Method and system for managing real-time data history of a file system."

BACKGROUND OF THE RELATED ART

Unlike a regular application that saves its contents in a file, a database is a structured logical data store that usually stores its data set in multiple files or storage volumes. A database may be a relational database, an object-oriented database, an email server (such as Microsoft Exchange), or a content management database. In a typical database server, there may be one or multiple databases; in some cases, some databases are for storing configuration information and others for user data.

In a relational database server, there are "system tables" and "user defined tables." System tables contain configuration data and user defined schemas, whereas user defined tables typically contain user and business data. For example, a customer database would contain customer data, while the structure of the database (e.g., name, phone number, etc.) is stored in the system tables in the form of schemas. In some database servers, all tables are stored in one database, while other database servers store system tables and user tables in multiple databases.

Although each database has its own files or storage volumes, the databases served by one database server as a group may be interrelated. For example, if a user table schema is lost from the system tables, the user data would not be accessible from the user defined tables. Therefore, the success of a data protection (i.e. backup and recovery) solution in recovering a database or a database server lies in its ability to reconstruct one or more related data sets to a consistent state when all the related files and devices are in synchrony at that recovery time point. When the data state of a database or a related set of databases of a server is not in synchrony, the data sets would be incorrect or corrupted and may become inaccessible by the database server (and thus inaccessible by the associated applications and users).

A database may store its data in a file system or directly into raw storage volumes. These data include the binary data (e.g., tables for relational databases) and a transaction log (write-ahead log). A database may store its transaction log in the same device or file system with its binary data, or it may store its log in different storage devices or different file systems. The files of all databases that belong to the same database server may reside in the same or different file system or device. As mentioned, a database data set can be stored either in files or in storage volumes, for simplicity, the following sections refer to database store as files.

Conventional data protection solutions for backing up and restoring a database server include scheduled tape based archiving and volume based snapshots. Although in most cases these solutions provide consistent recovery, they cannot eliminate or minimize data loss when failure occurs. They also do not address application downtime during data recovery. Over the last several years, disk/block base real-time journaling solution has emerged, which attempts to minimize data lost. A block-based real-time journaling solution is commonly known as Continuous Data Protection (CDP). Although addressing data loss, CDP cannot guarantee recovery consistency and integrity.

Currently, tape archive database protection solutions usually are scheduled to run once or twice a day while a database server is either shutdown or in quiescent mode (hot backup mode) during which the databases of the server is in consistent state.

Usually a database vendor provides a specific application programming interface (API) for the archive solution vendors. These API are designed for the following purposes—1) to enter hot backup mode (unless cold backup is carried out—i.e. server shutdown); 2) to retrieve full copy of binary data and log files; 3) to retrieve changes to binary data of a database after the last archive (for incremental backup); 4) to retrieve log changes of a specific database after the last archive; 5) to restore a database from the backup media; and 6) to apply incremental backup to a restoring database.

With the above API, tape backup vendors provide tape archive solutions. A database administrator may use a tape archive solution to perform a full archive once a week, and then perform daily incremental backup. The database administrator may also use a script to archive log files in hourly bases (or once several hours).

When recovery is necessary, the tape archive solutions provide a user interface for a database administrator (DBA) to restore the databases of a server from a full backup tape set. After that, the DBA may have to apply incremental backup tape set manually. The final step is to roll-forward the archived log to bring the database server to a point-in-time closest to the failure point.

There are many well-known problems with using tape archive solutions for backing up and recovering a database server. First, databases must be copied in full and then in change incremental from the host server to the tape media upon schedule. During copying this large amount of data, the database server is either shutdown or in a much degraded mode for a long time period. Second, data is at risk in between backups. Third, recovery is manual, in many cases, incremental recovery is necessary. The log roll-forward is also manual.

The entire restoring process may cost hours if not days of downtime depending on the data set size and the scale of incremental recovery and log roll-forward. In addition, data retrieval from tape media is slow, unreliable, and error prone. In some cases, recovery fails because of tape mishandling or media failure.

Volume snapshot solutions are designed to address the shrinking tape backup window (copying of data to tape with a limited backup window), and to eliminate manual incremental recovery because incremental backup is unnecessary. There are many volume snapshot techniques—such as split mirror, copy-on-write, and so on. These techniques offer different resource usage optimization and snapshot efficiency. The objective of all snapshot techniques is the same, which is to create a point-in-time storage device image. Unlike tape archive solutions, a snapshot usually can be taken with much shorter time, some volume snapshot techniques can complete a snapshot within seconds. To generate consistent snapshots, most snapshot services involve a quiesce of a database server (so that the server first flushes out its updates to the storage from system memory to make a persistent copy of its databases consistent), and then freezing of I/O activities during which a volume snapshot can be taken. When a snapshot is taken without quiesce of a database server (i.e., a hot snapshot), the disk images may not be consistent and may not be usable for recovery. In particular, the image may include fracture blocks, which cannot be used for recovery.

Because database files may be stored in multiple storage volumes, a consistent database snapshot requires that all volumes be captured at the same moment (i.e. consistency group); otherwise, the snapshot would not be useful for recovery. Some snapshot solutions are not capable of capturing consistency group.

During recovery, if a snapshot image is consistent and non-corrupted, the snapshot image can be copied to a recovering server and the database server can be started from that recovered data. After that, if there are archived logs, the log files can be used to roll-forward the binary files manually. If a hot snapshot is taken, the database administrator must first copy the databases into a recovering server, repair the databases and perform verification test. If the repair is successful, the database server can roll-forward the binary files using archive log files. In case the image is not repairable, another point-in-time snapshot must be selected, and the entire copy, repair, and verification process must be repeated.

Because snapshot is still schedule-based, in between snapshot intervals, there are still risks of losing production data. Although a snapshot can be taken very quickly, there is still requirement to quiesce a database server to get consistent snapshot image, therefore there is still server performance impact. When hot snapshot is taken, server performance impact is eliminated, however, that results in potential inconsistent snapshot images and increases recovery downtime as data repair and verification may be needed. With a volume snapshot approach, the entire recovery process is still manual; a database administrator must know which snapshot volume has what data and reconstruct the database storage volumes manually. This gets harder when database binary data and transaction logs are stored in distributed volumes. The entire recovery process may takes hours or days, and it involves identifying the snapshot volume image set, copy back the snapshot volumes into the right storage devices, repairing and verifying the integrity of the database, bring up database server, and manually roll-forward the necessary archived log.

A traditional real-time protection approach known as continuous data protection (CDP) is used to capture all the storage block changes of the primary storage devices that store the databases of a database server. The primary goal of this approach is to eliminate data loss causes by scheduled backup.

This approach involves first making a full image of the storage volumes that belong to a database server. After that, it continuously records all the block changes (persistent storage updates) as it occurs during runtime. Periodically, another full image may be taken. The storage for recording the block journal is known as time-addressable storage. Because the block updates are recorded continuously as they occur, one can reconstruct a storage volume from the time-addressable storage to any point-in-time by applying block changes to an initial full volume image. The reconstructed volume, however, is similar to a volume image taken from hot snapshot (see above) as the database server is most likely not in quiescent state; therefore, the database is most likely not in consistent state, and the data may be corrupted if fractured blocks are captured at that point-in-time.

Some CDP allows a database administrator to save a marker on the time-addressable storage, in which case a database administrator can quiese a database server and put a tag on the CDP storage to indicate that at that specific moment in time the volumes are in consistent state and the data is non-corrupted. The point-in-time tagging of the storage images is no different than a consistent snapshot. If only these tagged images are used for recovery, the benefit of performing real-time protection is not realized.

When recovery is needed for a specific point-in-time, a full image volume set from the time-addressable storage that is closest to the recovery point can be copied to the appropriate primary storage volumes of the database server. After that, the necessary recorded block journal can be applied to the recovering volumes to bring its state to a point-in-time.

Because the continuous journal of the primary storage results in continuous hot snapshot images being stored, one cannot guarantee that a recovered database server from the time-addressable storage is non-corrupted. Therefore, recovery could be a process of trial and error—first a database server data image is reconstructed from the time-addressable storage; second a database integrity verification process would determine if the database can be repaired. If the recovered database volumes are found to be corrupted, another point-in-time must be picked and the process starts again. The entire recovery process is no better then recovering a database from snapshots, in fact, in many cases, it could be worst. When logs and binary data are stored in multiple distributed volumes, the volume reconstruction process must be manually managed to ensure that all volumes are recovered correctly. When consistency tag is applied on the time-addressable storage, then the recovery result is no different then taking periodical consistent snapshot. In addition, time-addressable storage requires huge amount of storage space to continuously track the block changes.

The conventional approaches described above are not able to reduce data loss to near zero; indeed, even when CDP attempts to record block journal continuously, data loss may still occurs when a consistent database server cannot be reconstructed. IN attempting to reduce data loss, CDP however greatly increases backup storage cost and still cannot guarantee recovery consistency and integrity. All the conventional solutions require intensive manual handling of tape media, volume images, and archived logs. In addition, the recovery process is manual and error prone.

In addition, both snapshot and CDP manage data in the block level (storage device level) without any meta-information; these solutions do not know when a new volume is added to a database. As a result, managing these solutions requires manual work. Further, because these solutions do not have knowledge of what is inside the blocks, and because they are not capable of providing a backup catalog (user interface), granular recovery (e.g., database files, table space, transaction, etc.) is not possible.

BRIEF SUMMARY OF THE INVENTION

This disclosure describes a data management method wherein a real-time history of a database system is stored as a logical representation, and that logical representation is then used for any point-in-time recovery of the data set of the database system. More specifically, this disclosure describes a technique for capturing data, metadata, and events, and for track real-time history of a database system according to events. The technique enables tracking and storing of consistent checkpoint images (a consistent database version) of a database and a database server (which may be a set of databases), and also enables tracking of transaction activities in-between checkpoints. A data management system (DMS) object hierarchy may be used to implement a data structure for storing and tracking the real-time event based history. Once such a history is generated and tracked, a database or a database server with multiple databases can be recovered to any point-in-time in the past with guaranteed consistency. The databases can be recovered to any consistent checkpoint, or any point between two checkpoints, in which case the state of the databases can be rolled forward from a prior checkpoint to the desired recovery point using either transaction requests or write-ahead log entries.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
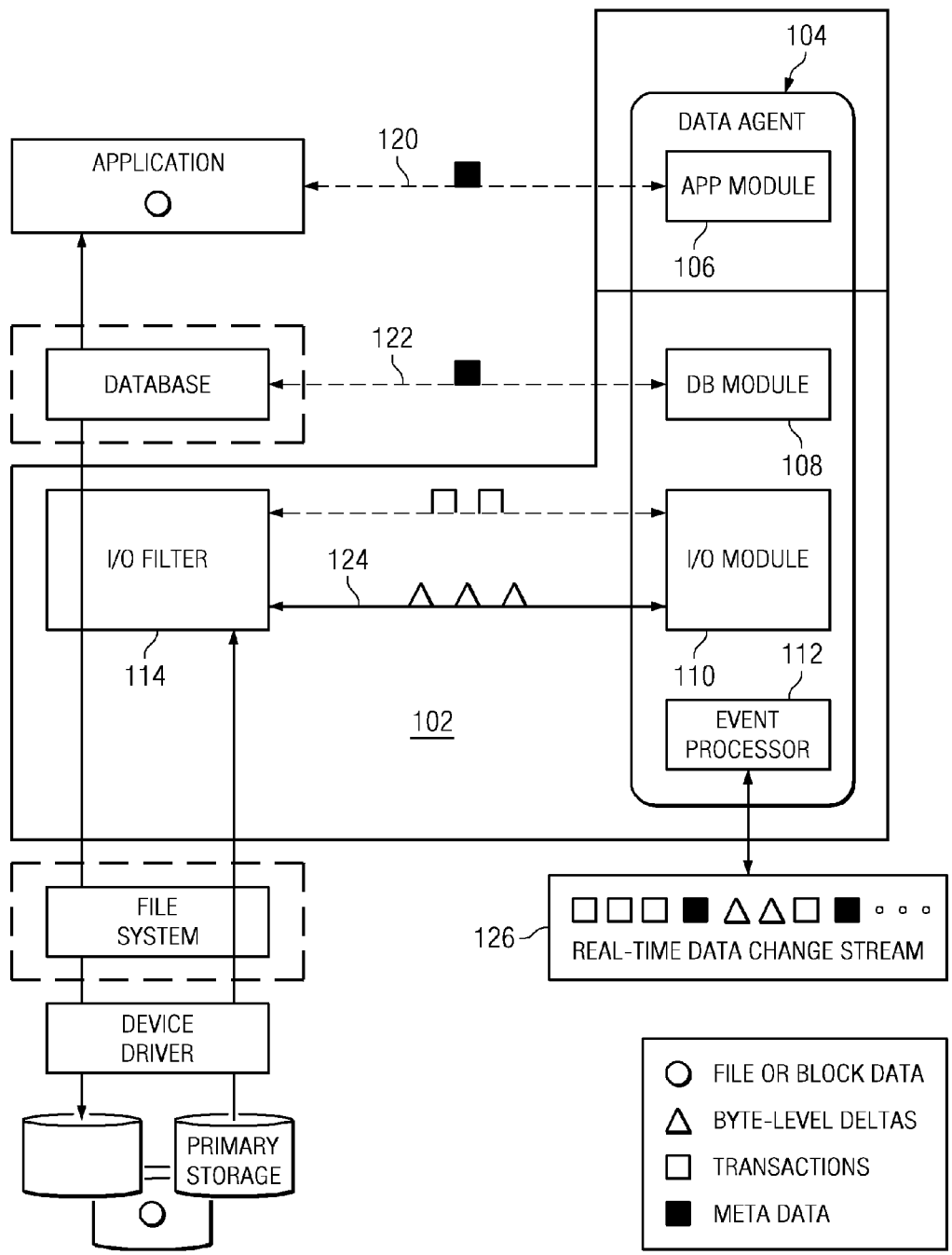
FIG. 1 illustrates a technique to generate an application-aware real-time event journal.

The subject matter herein may be implemented in a data management system (DMS) such as the system described in U.S. Ser. No. 10/841,398, filed May 7, 2004, U.S. Ser. No. 11/123,994, filed May 6, 2005, or U.S. Ser. No. 11/185,313, filed Jul. 20, 2005, the disclosures of which are incorporated herein by reference.

The following provides additional background information concerning database system functionality and operations.

A database stores its information in both its log and binary files. When update requests are received, the updates are first entered into the log files in the form of a redo journal (this is known as write-ahead log), and the actual binary data modifications occur in the system memory, which may be flushed into the binary files in the persistent storage in a later time for better performance.

The flushing of the binary updates from system memory into binary files would cause the binary file(s) to be consistent with their associated log file(s) at that instant in time when flushing is completed and before a next activity arrives and is entered into the log files. This consistent moment is known as a database checkpoint, during which, the database state is similar to or almost similar to when the database is cleanly shutdown. The checkpoint state of a database is a strong consistent state; this means if the persistent data at that moment is captured, the captured data can be used for recovering the database with guaranteed success. When the updates of a database are flushed into the binary files, a marker is entered into the database log. In some databases, there may be a separate checkpoint files for recording additional checkpoint information. For better performance, some database may not necessarily flush all the binary updates from memory to binary files during checkpoints; instead, the control information and some updates that are necessary to bring the database to a recoverable and consistent state are written out. In this case, the set of related files are also considered in consistent state.

When checkpoint occurs, the updates that are flushed from the system memory to the persistent storage may consist of some pending transactions (incomplete user transactions). When there are pending transactions during checkpoint, a journal of undo entries may also be entered into the log prior to the checkpoint marker for rolling back those transactions in case the database state has to be restored to that checkpoint in the future.

Periodically, a database server generates checkpoints based on some parameters—such as maximum allowed memory usage, and checkpoint interval. The memory updates of a database are either flushed at checkpoint interval or when memory utilization threshold is met. This means that a database with very high write rate could result in more frequent checkpoint then its configured checkpoint interval. Besides a database's internal checkpoints, there are many different ways to trigger a database to flush out its cached data and force a checkpoint. One of which is to issue a CHECKPOINT SQL statement, another way is to shutdown a database, yet another way is to put a database server in quiescent mode by locking database tables, putting a database server in hot backup mode, or by a specific API provided by a database vender.

When checkpoint occurs, or when a database administrator performs a log archive operation, a database may reclaim the old log space (log roll-over), or shrink/truncate the log files. The database administrator may also expand the log file during runtime.

Traditional tape or disk based backup or snapshot solutions, usually once a day (e.g., tape or virtual tape library backup) or once every few hours (e.g., disk volume snapshot) copy the persistent data of a database to a backup media. During the copy process, it is required that the database state be consistent; therefore, the copy process is carried out either when a database is shutdown or when a database is in "hot backup" or quiescent mode (during which the database is checkpoint-ed and frozen to prevent new updates to enter its files, so that its state is clean). In some databases, additional changes during backup are not allowed, while in some databases, all the changes during backup are only entered into the log files. After a backup is completed, IT administrators often use a database archive interface to archive the log files generated after the last binary data backup for recovery purposes. Using these traditional methods for backing up data either result in significant downtime or performance impact on the database.

As noted above, traditional Continuous Data Protection (CDP) schemes today capture data in the storage block level; as a result, they are unable to detect checkpoints and cannot identify real-time consistency points. Traditional CDP also does not have capability to capture metadata of a database.

It is known to provide real-time database protection using a real-time host based driver and an optional storage (block level) driver to allow for event detection, metadata gathering, and flexibility of data capturing in either file or block level. By doing so, data can be captured in real-time and indexed with the metadata and events. In this way, a consistency point along the data timeline can be identified, and meta-information can be associated to and add meaning to the data to allow for granular recovery. A technique of this type is implemented in a data management system (DMS) that is available from Asempra Technologies, Inc., of Sunnyvale, Calif. As described in co-pending application Ser. No. 10/841,398, the DMS system associates a "host driver" with one or more of the application(s) running in the application servers to transparently and efficiently capture the real-time, continuous history of all (or substantially all) transactions and changes to data associated with such application(s) across the enterprise network. This facilitates real-time, so-called "application aware" protection, with substantially no data loss, to provide continuous data protection and other data services including, without limitation, data distribution, data replication, data copy, data access, and the like. In operation, a given host driver intercepts data events between an application and its primary data storage, and it may also receive data and application events directly from the application and database. By intercepting data through the application, fine grain (but opaque) data is captured to facilitate the data service(s). The DMS servers provide a distributed object storage that can be built above raw storage devices, a traditional file system, a special purpose file system, a clustered file system, a database, or the like. As described in co-pending application Ser. No. 11/123,994, each DMS node executes an object runtime environment. This object runtime environment includes an object manager that manages the lifecycle of all the DMS objects during runtime. The object manager creates DMS objects, and the object manager saves them in the shared storage. The objects continually undergo modification as the system protects data in the enterprise's primary storage. In an illustrative embodiment, the system automatically creates a trail of objects called versions; typically, the versions do not actually exist on primary storage, outside of the data management system. The DMS manages the creation, storage, display, recovery to primary storage, deletion (automatic via policy, or manual) and the like, of these versions. The host drivers protect data into the continuous object data store. Using this architecture, data in primary storage can be recovered to any point-in-time.

As mentioned in earlier sections, due to the write-ahead log, during runtime, the state of a database's log is usually ahead of its binary data in the persistent storage. This means that during runtime, the binary data and log files of a database are usually in an inconsistent state in the persistent storage. The only times when the state of a database's log and binary files are in synchronous are 1) when a database is shutdown, 2) when a database is in quiescent mode (triggered externally in the event of hot backup, tables maintains, etc.) or 3) a moment right after an internal checkpoint is completed and before a new activity arrived. When the binary and log files of a database are in synchrony, the database is in strong consistency state; this is perfect time to capture the database data. Out of the three situations, only database checkpoint is generated by the database itself, and the frequency of checkpoint can be relatively high. To save a copy of a database persistent data for recovery in a later time and with guaranteed success, one could capture a database in a strong consistent state as identified above. A database could also be recoverable if the captured data is in a weak consistency but non-corrupted state—when its log is intact and ahead of its binary file, and the state of its files and database headers are synchronous.

Most conventional data backup solutions capture the database state when the database is shutdown or in quiescent mode for prolonged period of time to make a copy of the database. These solutions are not capable of capturing a runtime consistent checkpoint, because a database checkpoint state may exist for only a very short moment, potentially a fraction of a second.

With conventional backup solutions, the steps to restore a database to a point-in-time after the last consistent backup are handled manually by a database administrator. When point-in-time recovery is necessary and when archived log files are available, a database administrator typically first recovers a complete database to a point-in-time closest to the desired recovery point by recovering all the binary and log files from a full backup, and then manually applies incremental backups to those files. Once a full database is recovered, a database administrator uses the sequence of archived log files, which are saved after the last backup, to manually roll forward the binary data state. These manual steps can be error prone and time consuming, and can take hours or days. The duration of the restoration depends on the number of incremental backups and archived logs. During recovery, in some cases, the necessary log files may not be available because the files may be corrupted or missing before archive could occur. In such case, the data state of the desired recovery point-in-time cannot be reconstructed and there would be data lost upon recovery.

As noted above, traditional CDP capture data in storage volume level and records change in storage block. As mentioned, these CDP schemes cannot identify consistency point of the data it captured. Worst yet, for large databases, a database administrator typically stores the binary data and log data in separate volumes. These separate volumes may be attached to the database host server through the same or different paths. If traditional CDP capture the blocks through different paths, they may capture out of order data. For example, they may capture binary updates of a partial transaction before any part of the transaction is logged, such that undo cannot be carried out during recovery. Therefore, traditional CDP not only cannot detect a consistency point, they may not be able to recover a database with consistency when they capture out of order data blocks. Even when consistency is maintained in some cases, recovery using traditional CDP requires a database consistency verification process, which along with recovery of the files may take hours to days.

The subject matter described herein captures data and monitors events in real-time, therefore, it is capable of assembling captured data to form strong consistency when a checkpoint event is detected. It is also capable of reconstructing a weak consistency data set at any point-in-time by combining a strong consistent copy the database and necessary log entries that include transactions that occur after the checkpoint. The current invention is data aware. In particular, it recognizes log files versus binary data files; as a result, it is also capable of tracking real-time redo log entries. These capabilities allow the subject matter herein to enable consistent guaranteed recovery to any point-in-time.

In particular, and as will be described in more detail below, when any point-in-time recovery is desired, the technique described herein re-constructs a database by combining a consistent database data set and subsequent log entries that contain continuous redo journal occurs after the consistent data set to form a consistent point-in-time database state. Once reconstructed a database set, it allows a database to automatically roll-forward its binary data state to the desired recovery point-in-time. Because the technique described herein tracks database checkpoints, and those checkpoints occur frequently, the real-time redo log that has to be captured between two checkpoints are relatively small. The technique also induces checkpoints as necessary. During recovery, when the described technique combines a checkpoint with redo log captured in real-time, the amount of time for the database to roll-forward is almost negligible. When combined with virtual on-demand recovery such as described in Ser. No. 11/185,313, filed Jul. 20, 2005, the subject disclosure is capable of recovering a database server within seconds regardless of the database size.

The following provides further background material.

As mentioned above, a database server may serve one or more databases. In some database servers, system tables (for storing database control and configuration information) may be stored as separate databases, while in other servers, system tables may be stored together with user databases. As a result, when a user database failed, one may not be able to recover the data by simply recovering the data and log files of one particular database. In the situation when a database server serves multiple databases in parallel, the databases may be interrelated and therefore, these databases must be recovered with consistency. In the case, when system tables are stored in a separate database, the databases of the server must be recovered as a set when all the files are in synchronous otherwise, user data could become inaccessible. For example, if a user table schema is modified, or new user data file is added, these changes must be first entered into the system tables before the modification of user data takes effect. In the event, when a later set of user tables are recovered with an older set of system tables, the user tables would contain data that requires newer configuration information, and as a result those user tables might become inaccessible or appear to be corrupted.

Because conventional data protection solutions shutdown or quiese a database server during backup, these solutions guarantee the consistency of database server upon recovery. The disadvantages of these solutions are associated with data loss and recovery inefficiency as described in the above section.

Because a database server may have multiple volumes, its binary and log files of different databases may be stored in different volumes, if traditional CDP capture the databases through different IO paths, they cannot guarantee recovery consistency. The shortcomings of these solutions are described in above section.

The current invention identifies consistency point(s) of an entire database server rather then each individual database within a server. It captures all the databases during checkpoint, and it captures log changes through the same data path to preserve the actual write-order so that consistency across multiple databases during recovery can be guaranteed.

Database Integrity

A database server divides its binary and log files into headers and pages. A database server updates a record (header or a page) in its entirety (i.e. never partial). While capturing database changes in real-time for recovery purpose, it is important to capture the changed records in their entirety, yet at the same time the change order of these records mush be preserved. If change order is not preserved, or fractured records are captured, a database may not be reconstructed (i.e. when put together, the data is corrupted). In addition, during runtime, new binary and log files may be added, and these new files may be added to a new volumes. When protecting a database in real-time, changes to new volumes must also be captured in order to ensure recoverability of the database.

The conventional tape and disk based backup solutions do not encounter this challenge regarding recovery integrity, as they do not capture data in real-time.

Traditional CDP schemes capture data in block level and often in storage network; as a result, the captured block may not necessary line up with the records. Also, these solutions do not capture meta-data and have no knowledge of when new storage is added to the database during runtime. These solutions cannot guarantee recovery integrity.

As will be described, the technique described herein captures meta-data and captures change records in atomic fashion. It also preserves the change ordering while storing and indexing the change history. When new volume is added to a database, the new volume is instantly being protected. As a result, recovery integrity is guaranteed.

Based on the DMS continuous object store, this disclosure takes a real-time database-aware data management approach to backup, distribute, replicate, and recover a database or a database server with zero or near zero data lost, with negligible server impact, guaranteed integrity and consistency upon recovery, significantly reduced recovery downtime, and significantly eliminate possible human error during recovery. The combination of the current invention and a prior invention on virtual-on-demand recovery (Ser. No. 11/185,313) significantly reduces recovery downtime, to the range of seconds rather then hours or days, independent of the data set size. Also the combination of the current invention and a prior invention (Ser. No. 10/943,541) on two-stage delta reduction greatly reduces storage requirements for tracking real-time database history.

As mentioned, a database may store its data in a file system or directly into raw devices. The following discussion of the current invention uses a file system as underlying data store for databases simply as an example and is not intended to be a limitation. For example, when a database is added or expended, if a file system is used as the underlying store, the file system CREATE event would be detected. If a storage device is used as the underlying store, a storage device addition event would be detected. The following discussion uses file system events merely as examples.

The current invention protects databases in real-time by streaming real-time event journal from a host server, where a database server resides, to a DMS cluster where realtime database history is tracked and maintained. The current invention can also protect a database by capturing and streaming real-time data changes from a network storage device to a DMS cluster.

A real-time event journal is also sent from a DMS cluster to another DMS cluster for data distribution, and from DMS cluster to another standby host server for data replication service. When recovery is necessary, a recovery point of any point-in-time can be selected in the database history and the state of the data at that desired recovery point is reconstructed at a recovering host server.

DMS Host Driver for Real-Time Database Protection

The DMS Host driver for providing real-time database protection, recovery, and replication services is platform and database aware. As illustrated in FIGS. 1-4, a simple host driver 102 may consist of only one data agent 104 and one I/O filter 114. Alternatively, a host driver (in FIG. 2) may have one control agent 201, multiple data agents 104a-104c, and an I/O filter 114. A data agent may protect one or more data sources; it may have three modules—application module 106, database module 108, I/O module 110, and an event processor 112. The application module is for tracking application meta-information. The database module is for tracking database meta-information. The I/O module is for configuring what I/O to monitor, and the event processor processes raw events and generates a real-time even journal stream.

A host driver 102, in particular the database module 108, is able to determine type of database server, the number of databases in a database server, to locate the log and binary data files or devices to protect or replicate, to look out for new files or volumes that are added to a database server during runtime, to watch for changes happen to the log and binary data, and to watch for database checkpoint events, and to watch for log structure changes. It also forces a database checkpoint as needed for creating a point-in-time consistent database as triggered by users or user configuration.

A DMS host driver is a finite state machine (FSM) that with significantly no downtime, automatically switches state to upload protected databases, protect the data (by streaming real-time events and information), perform resynchronization upon any transfer failure or network congestion, recover data as instructed, and so on. This technology is described in U.S. Pat. No. 7,092,396. When a host driver data service is initiated, the host driver first creates a consistent snapshot of the databases to be protected and uploads to the DMS as baseline. Optionally, the host driver may simply upload an inconsistent image as baseline and then follow up with subsequent consistent versions. After upload is completed, it watches for I/O and database events and streams the data, metadata, and events to the DMS accordingly. A set of DMS active objects are created by the host driver to receive the real-time event journal of the databases and track the real-time history of the databases.

In real-time the DMS host driver captures log entries in full through I/O filter 114, so as to provide any point-in-time recovery. Periodically, upon detection of a database checkpoint, a consistent set of binary and log files from the server are synchronized with their associated DMS active objects in DMS cluster to generate new database version. By detecting a database checkpoint rather than frequently forcing database consistency by putting a database server in quiescent mode, the DMS host driver significantly minimizes performance impact to a database server. With the combination of the checkpoint data and a real-time log, a trail of real-time history is maintained by the DMS active objects such that the protected databases of a server can be recovered to any point-in-time in the past with guaranteed strong consistency. The DMS host driver also performs virtual-on-demand recovery (a separate invention) that reduced recovery time to seconds regardless of the size of the data sets.

Figure 2:
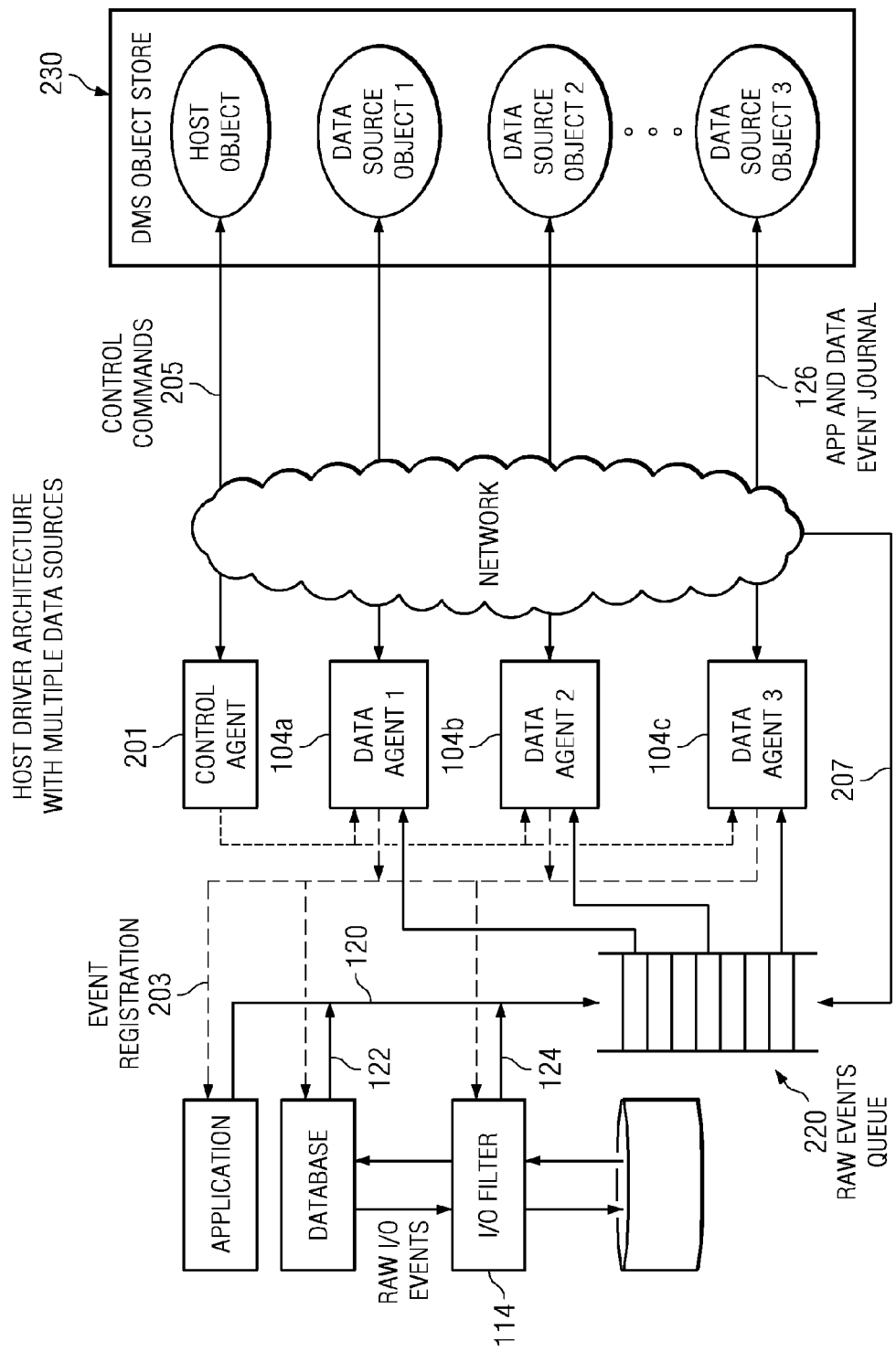
FIG. 2 illustrates a first host driver architecture for use with a data management system (DMS) with multiple data sources.
Figure 3:
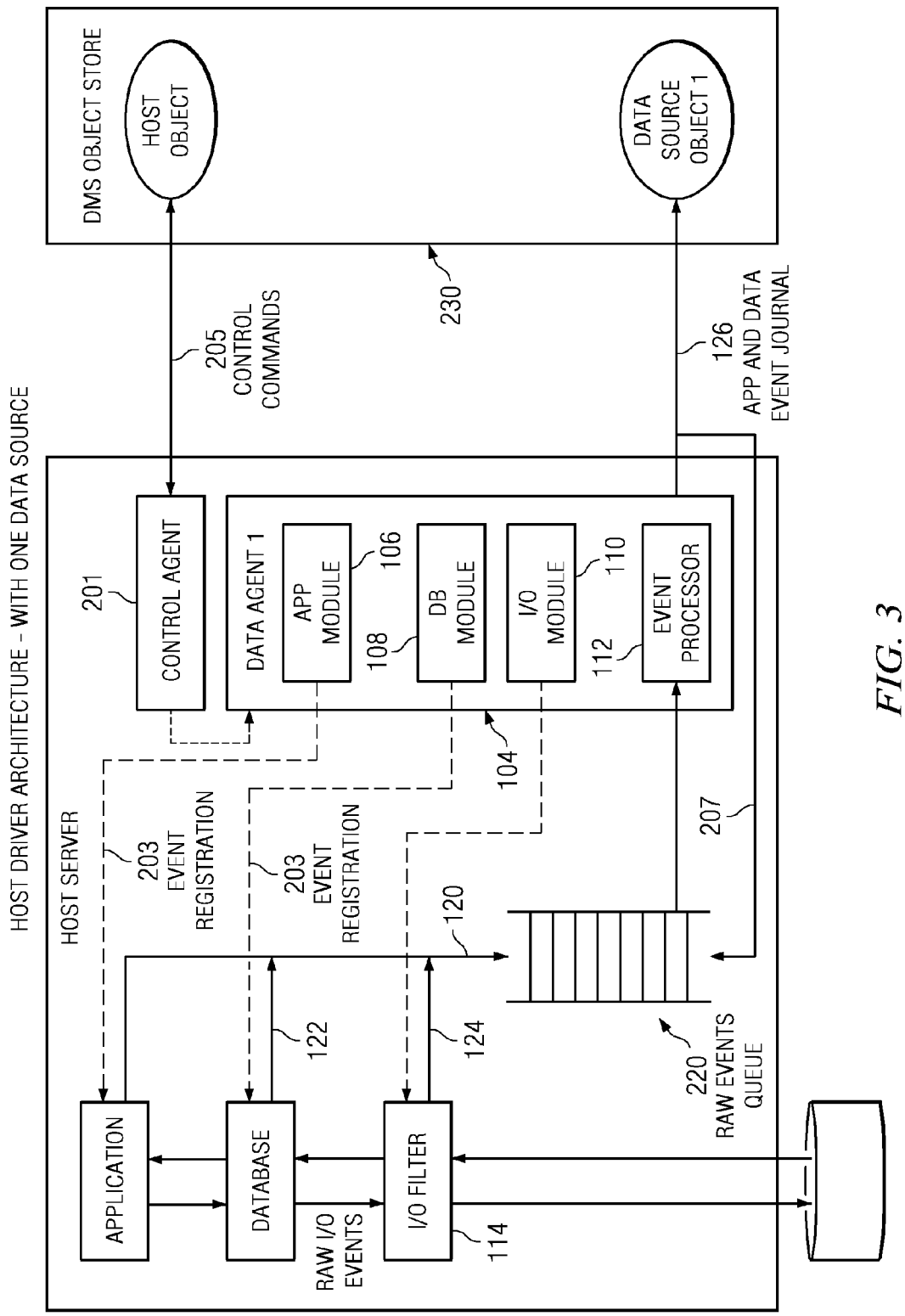
FIG. 3 illustrates the first host driver architecture for use with a single data source.

One embodiment of a DMS host driver has a control agent and one or more data agents with each data agent responsible for a protected data source, as seen in FIG. 2. Within a data agent, one embodiment includes an application module, a database module, an I/O module, I/O filter, and an event processor, as seen in FIG. 3. The application module, database module, and I/O module are responsible for configuring or registering to receive application, database, and I/O events. These modules also extract necessary metadata. The I/O filter captures data changes. Together, the change data, metadata, and events are processed by the event processor 112 to remove unnecessary redundancy and prepare for the DMS data source to store and index this real-time history.

Figure 4:
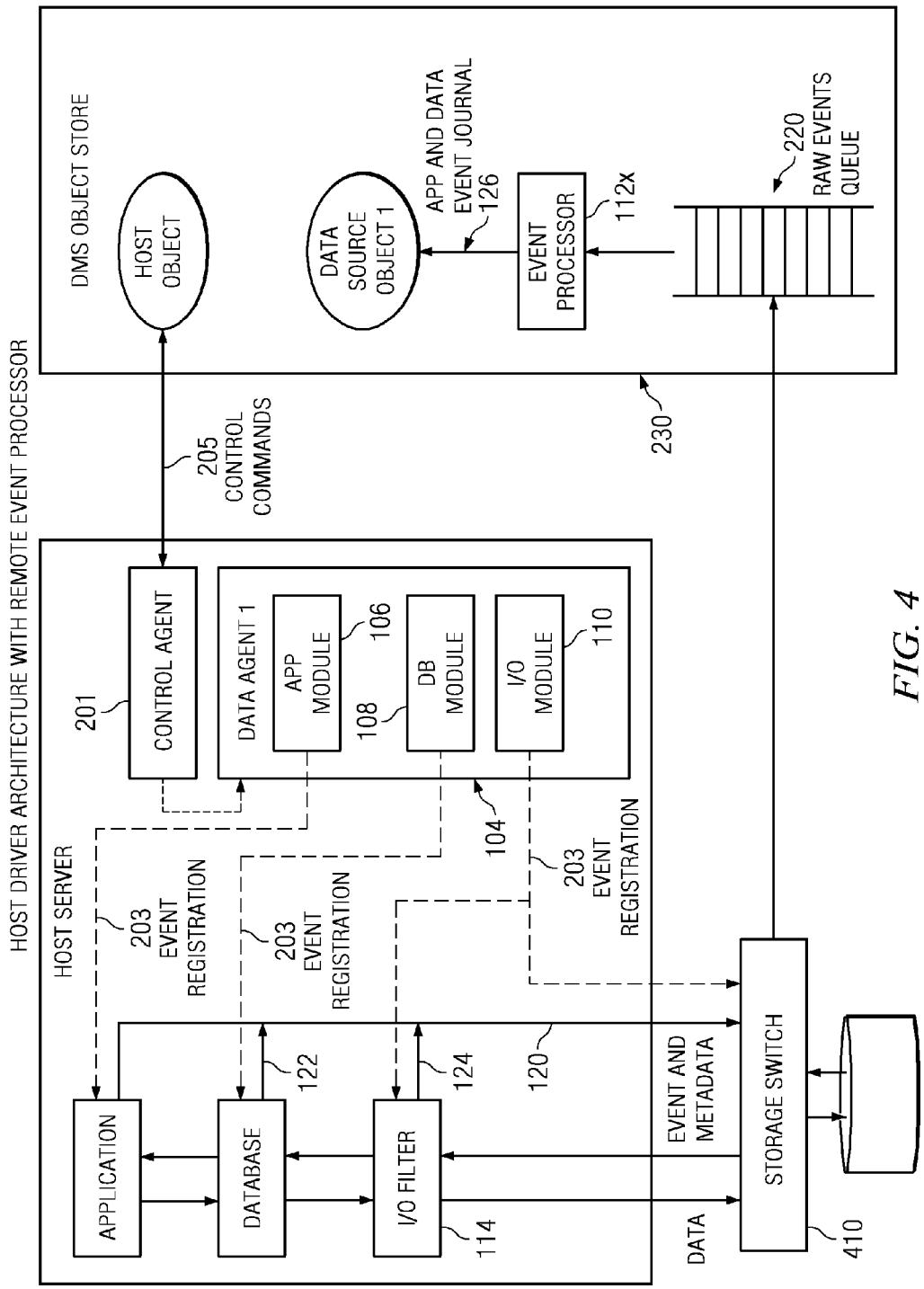
FIG. 4 illustrates the first host driver architecture for use with a remote event processor.

An alternative embodiment allows the components of a data agent to be spread out partially in the protected host server, partially in the DMS, and possibly partly in a storage switch. FIG. 4 shows one possible embodiment where the application, database, and I/O modules reside in the host driver to configure to receive the proper events as well as extracting metadata. The I/O filter 124 may reside in the host as illustrated in FIG. 4, or it could reside in the storage switch 410. Alternatively, the I/O filter 124 could be embedded in yet another appliance attached to the storage switch 410. The I/O filter 124 may capture file level I/O, file level events, storage volume level I/O in blocks, or storage volume events. In this diagram, the storage switch is configured to stream raw information into a queue in the DMS. The event processor 112 in this case can reside in the DMS to process the raw events. Alternatively, the I/O raw events may be streamed to the event processor by the I/O filter 114 from wherever the filter reside.

Database Real-Time Event Streaming

Database real-time event journal includes transaction data, binary data changes, the metadata information, and the events that may or may not be associated with the changes.

Some examples of database events that are associated with database changes include—ADDING files or new storage devices, CREATE database, CREATE log, MOVE/RENAME (relocation of the data set), REMOVING files or devices, DELETE database, file or device OPEN, log record WRITE, TRANSACTION entry, binary data WRITE, file or device CLOSE, SET metadata, database CHECKPOINT, BEGIN-CHECKPOINT, END-CHECKPOINT, SNAPSHOT, log ROLLOVER, log TRUNCATE, log EXPAND, and log ALTER. Log ROLLOVER, TRUNCATE, and EXPAND are fine grain events that alter the structure of the log files, one can simply use log ALTER event to represent any of the collection of log events. CHECKPOINT can be instantaneous, or can be a sequence of events—BEGIN-CHECKPOINT, DELTA binary file, WRITE binary file, SET property, and END-CHECKPOINT. Also, CHECKPOINT events may be generated by a database server, trigger by users, or other software or hardware applications or utilities. These are some examples of database events; in some cases, there may be more events, in other cases, multiple events may be combined into one.

In addition to the above-mentioned events, DMS also tracks events that may not necessary associate to data changes; examples of these events include database server START, database server STOP, software upgrade, virus alert, specific user tags, and so on. These events can be used as information for administrator to identify a recovery point when recovery is necessary.

Metadata may include location of files, which file is for what database, which file is binary and which is log, the database page size, header size, header information, checkpoint information, access control, database schema, and so on. It is desirable to capture change data according to database page size. If fractured pages are captured, a database cannot be reconstructed, when assembled using fractured pages, the recovered database may be corrupted. The current invention preferably uses the page size meta-information for both log and binary data capturing to prevent capturing fractured pages.

The DMS host driver detects and captures the above mentioned events along with changed data. It also retrieves and captures database metadata, and then forms and streams a real-time event journal to the DMS Active objects. A DMS host driver either resides entirely in a host server, or partially in a host server, partially in a remote device or the DMS, as seen FIGS. 1-4.

The DMS object system typically handles four types of events: creation, modification, termination, and destruction events. Creation events cause new DMS active objects to be created. Modification events cause new object versions to be generated. When a new version of an object is generated, its previous version is terminated. Termination events terminate the last version of an object and end the history of the object.

Destruction events permanently delete an active object and its entire history in the DMS system. In some cases, the creation, modification, and termination may be triggered by a singleton event, in other cases, a sequence of sub-events is required to cause the DMS object history to change.

For databases, examples of the creation, modification, and termination events are:

| Events for creation of DMS database objects | Events for modification of DMS database objects | Event for termination or destruction of DMS database objects |
|---|---|---|
| Create a new database data source: {CREATE db data source, SET properties, . . . add databases, ... CLOSE} Create a new database: {CREATE database object, SET properties, . . . add files or storage group, CLOSE} Add a new storage volume, create a log file, or create a binary file : {CREATE log file, OPEN parent object (database or loggroup, etc.), SET properties, WRITE, DELTA, RENAME/MOVE, ALTER, MAKE VERSION, . . . , LINK, CLOSE all objects} Create log-group: {CREATE loggroup, OPEN database, LINK file, SET properties, . . . , CLOSE all objects} | Entering transaction: {OPEN log record file, SET properties, TRANSACTION (to app-level log group), . . . , CLOSE} Add binary log entry: {OPEN log file, WRITE (log file), DELTA, SET properties, . . ., CLOSE} Rename or move any database file: {OPEN file, OPEN new and old parent as necessary, SET properties, UNLINK and LINK as necessary, . . . , CLOSE} Modify binary file: {OPEN binary file, WRITE, DELTA, SET, . . . , CLOSE all objects} Changing log file structure: {OPEN (log file), LOGALTER, ROLLOVER, SHRINK, EXPAND, WRITE, TRUNCATE, DELTA, CLOSE} Making a checkpoint: {CHECKPOINT (database name/s), or {BEGIN-CHECKPOINT (database name), END-CHECKPOINT} Note: BEGIN-CHECKPOINT and END-CHECKPOINT allows a new version of all the database files to be created and transactions post the checkpoint to be received while still receiving updates to the previous version of binary files. Force a new version to a particular database file assuming changes already occurred: {MAKE-VERSION} | Note that Delete terminates an object history from capturing any future information while Destroy permanently removes an object history from the DMS. delete a database: {OPEN database and all it child objects, MAKE-VERSION (only if there are updates currently), SET terminateDate property of all the object, CLOSE all objects} delete a sub-object of a database - storage volume, a log file, a binary file, or log group: {OPEN the object, SET terminationDate, MAKE-VERSION, OPEN the parent object, UNLINK from parent, MAKE-VERSION on parent, CLOSE all objects} Destroy a database: {OPEN, GET CHILDREN, CLOSE, OPEN DS object, UNLINK from DS, DESTROY all objects starting from bottom of the tree, CLOSE DS } Destroy a sub-object of a database: {OPEN parent object, UNLINK from parent, DESTROY object, CLOSE parent} |

For example, a new object may be created with a sequence of events such as—{CREATE, WRITE(s), SET(s), CLOSE}. The sequence of events that creates an object often involve the modification events—WRITE, SET, etc. While modifying an object cause a new object version to be generated. A new object version can be generated by—{MAKE-VERSION} while an object is opened and in the middle of an update, or {OPEN, SET, WRITE, TRANSACTION, DELTA, LOG ALTER, CLOSE}. Deletion of an object simply ends the last version and terminates the history so that there will be no new history to add to the object. Terminating an object history could simply be stamping the TerminationDate and Time property of the object, and unlink the object from its parent(s) for the future (i.e. unlink from the parent's version pages). Destroying an object from DMS means to completely remove the object from the DMS storage.

DMS Objects for Tracking Database History

Figure 5:
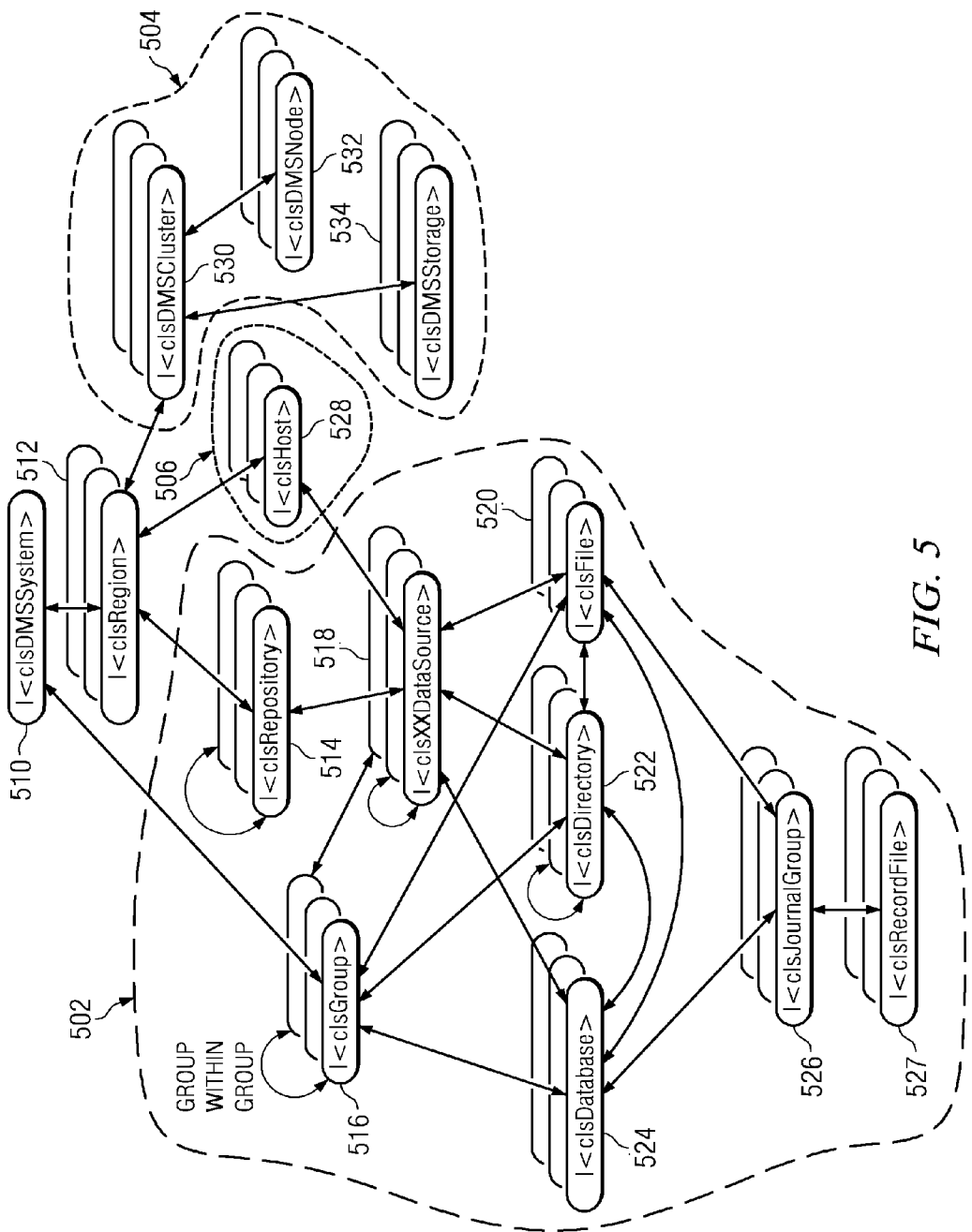
FIG. 5 illustrates a DMS object instance hierarchy.
Figure 6:
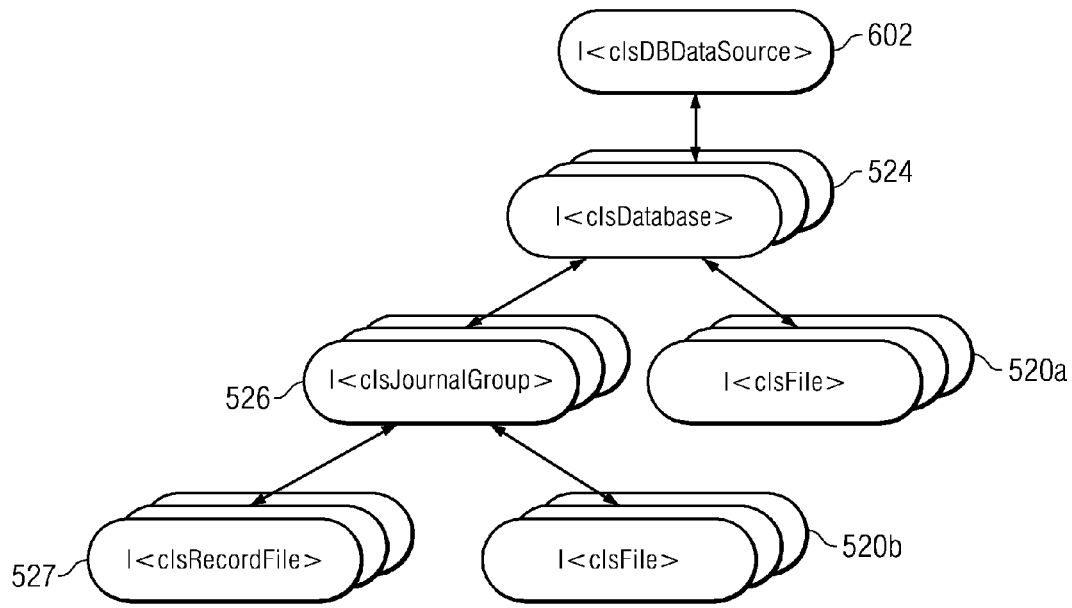
FIG. 6 illustrates a DMS database instance hierarchy.
Figure 7:
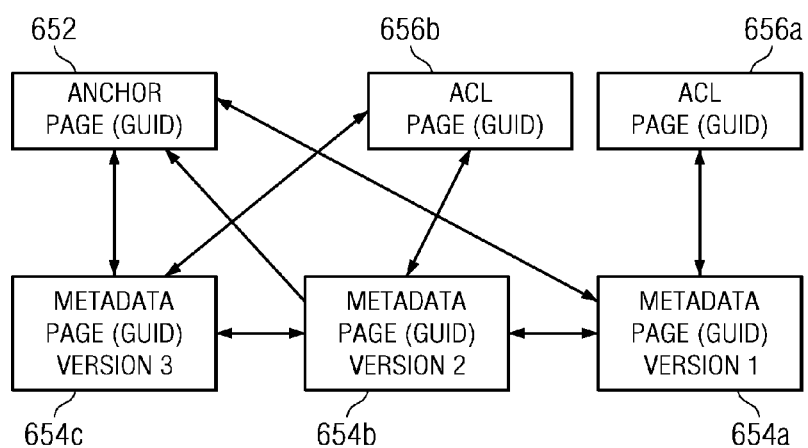
FIG. 7 illustrates a data structure of a simple DMS object instance.

FIG. 6 shows one embodiment of DMS object class hierarchy of a database data source (clsDBDataSource 602) for managing data history of a database server. This diagram is a subset of the complete DMS object class hierarchy defined for enterprise data service depicted in FIG. 5, which also includes file system object classes (522, and 520), policy management object classes (510, 512, 514, and 516), and logical data management classes (510, 512, and 514), and physical network representation classes (528, 530, 532, and 534). The clsXXDataSource 518 can be a file system data source class or a database data source class 602. Some of these classes can be eliminated, the class hierarchy can be re-arranged, some classes can be merged into one, or some classes can be divided into multiple classes. The objectives of this class hierarchy is 1) for managing enterprise realtime data history by indexing changes, meta-information, and events, 2) for providing realtime data services, and 3) for enforcing data management rules and applying compliance regulations.

An instance of a database data source class (i.e. clsDBDataSource—602 as labeled in FIG. 6) is used for storing metadata as related to a protected database server. Because a database server may serve multiple databases, a database data source owns the one or more database instances (clsDatabase—524). A database instance has a time dimension that is not shown in this object hierarchy diagram. In the time dimension, a database instance has multiple versions, each version represents a point-in-time when a database is consistent or the entire database server is in a consistent state. A database version is generated typically when a database generates a checkpoint. A database instance has a number of file objects some of them are binary data files, others are log or control data files. The data and control files (clsFile—520a) are linked directly to the database instance, while the log files (clsFile—520b), in one embodiment, can be linked to the database instance via a journal group object instance (clsJournalGroup—526). Optionally, the log file instances (520b) can be connected directly to the database instance (524). The advantage of having a journal group is that a journal group instance allows different type of transaction records to be grouped and associated with a database version. Similar to a database object, all these objects, binary files, control files, log files, and log groups, each has a time dimension and each has a trail of versions. All these related binary, log, and control files may be forced to generate new versions simultaneously when a database version is generated so as to form a consistent image of the entire data set.

A database instance (524) may have one or more journal group instances (526) if multiple types of journal are to be tracked. A journal group instance is for tracking database journal (i.e. trail of changes to a database). Database activities can be captured from different sources. One is to capture successful requests from the service interface (e.g., an email transaction, a SQL statement, etc.), another source is to capture the binary entries that record in the write-ahead journal log files, yet another source is to capture activities through a database stored procedures/triggers etc.

ClsRecordFile (527) is an embodiment that may be used in a journal group to track application level transactions in the form of SQL statements that may be captured from service interface or a special purpose stored procedure. ClsRecordFile (527) instance and a clsFile (520b) instance are embodiments that maybe be used in a journal group, one for tracking the meta-information about binary log activity, another one for tracking the actual data chunks written to the log file.

A journal group is not a requirement for tracking multiple database journal types; it is simply one way to isolate multiple types of database journals. The above mentioned object hierarchy for tracking database history is simply an embodiment of the current invention, these are not the requirements for storing and tracking database history, there are many different ways of tracking and storing journal and binary changes with current invention. For example, clsRecordFile and clsFile can be combined to form one single DMS active object (i.e. one data structure). Journal group is an abstraction; it can be eliminated especially if only one journal type is to be captured. Alternatively, journal information can be stored as part of a clsDatabase instance. In another embodiment, file system hierarchy (with directories, sub-directories, and files) can be introduced in addition to database objects for tracking database history.

This disclosure describes a technique for capturing data, metadata, and events, and track real-time history according to events. In particular, tracking and storing consistent checkpoint images (a consistent database version) of a database and a database server (which may be a set of databases), and also tracking the transaction activities in between checkpoints. A data management system (DMS) object hierarchy may be used to implement a structure for storing and tracking real-time event based history of databases. Once such a history is generated and tracked, a database or a database server with multiple databases can be recovered to any point-in-time in the past with guaranteed consistency. The databases can be recovered to any consistent checkpoint, or any point between two checkpoints, in which case the state of the databases can be rolled forward from a prior checkpoint to the desired recovery point using either transaction requests or write-ahead log entries.

A DMS object system is an object database instantiated based on the class hierarchy as shown in FIG. 5. The DMS object system is designed for tracking event based real-time information history. In the DMS, preferably each object has a set of properties, some of the properties are versioned and others are not. In one embodiment as shown in FIG. 6A, the non-versioned properties can be stored in an anchor page (a logical structure) 652, and versioned properties can be stored on metadata pages (654a, 654b, and 654c). Additionally, more pages can be created for specific data such as ACL and binary data for object schema such as file objects. Binary data includes baseline binary and deltas for tracking binary data changes. The idea is to create a logical structure as an embodiment for the invention. Following are a list of object schemas created for managing real-time database and database server history.

ClsDBDataSource

A database data source object instance serves as a container for the history of a protected database server. It is also a data service entity for managing inbound (data protection stream, or inbound distribution stream), and outbound (for distribution and replication services) event stream for the databases. This instance owns one or more databases. It may provide time sequence as index to coordinate the journal activities across all its database instances to ensure recovery consistent across multiple databases.

The properties of this object class include the configuration of the protected database server. Following is some property examples of this object class:

| Properties of ClsDBDataSource | Descriptions |
|---|---|
| ID | Its own GUID |
| Name | Name of the data source |
| Parent | GUID of its parent container (a repository object) |
| DateTimeCreated | Timestamp when this data source container is created |
| Owner | The user ID of the creator |
| ACL | Key or GUID to the access control list of this object |
| DataSourceType | Database |
| RuntimeStates | Protecting, replicating, disconnected from host, etc . . . |
| Status | Active, archived |
| Master | GUID of the original protected data source (if this is a replica) |
| Replicas | GUID of the replicas that need input from this object |
| Host | GUID of the associated host object where the data source resides |
| DB Vendor | MS, Oracle, etc . . . |
| DB Model & Version | MSSQL 2005, Oracle 10g, etc . . . |
| DB Server name | The name of the service instance |
| DB checkpoint timeout | DMS could force a database checkpoint if there is no database internal checkpoint for this period of time |
| ProtectedDateTime | Timestamp when protection begun |
| ArchivedDateTime | Timestamp when this data source became idle |
| Children | List of clsDatabase instances |
| EventTags | List of entries with event and timestamp. The events are in data source level, may be set by users. |

The above table is a subset of properties used in the DMS; one may add more or remove some of the above properties. For example, there may be more database server configuration information, policy for managing the protected data may be added, and one may not need RuntimeStates. In one embodiment, the properties of this object are not versioned, which means that the history of the above properties is not tracked. Alternatively, one can version some of the properties such as DB server name, DB model, DB version, DB checkpoint timeout, ProtectedDateTime, ArchivedDateTime, and Children so that these configuration changes are recorded in time. When properties are versioned, it would also make sense to track the version begin and end timestamp.

ClsDatabase

ClsDatabase schema is defined for tracking the history of a database of a database server. There may be one or more instances of clsDatabase in a clsDBDataSource (history of a database server). A database object has a set of binary files, control files, and write-ahead log files. A database object may also track real-time application requests (in SQL statement, email, etc.), or any specific redo activities. This object tracks database checkpoints. When a checkpoint occurs, a version of the object is created to represent a consistency point. Within the version, all its files and journals are versioned as well to form a consistent and clean point-in-time image. Note that versioning is one way of indexing in the DMS, it allows for fast traversal on a time line.

Because a data source may have multiple databases, a database object also coordinates with other databases through its data source object to generate a consistency group index for cross consistency.

Figure 12:
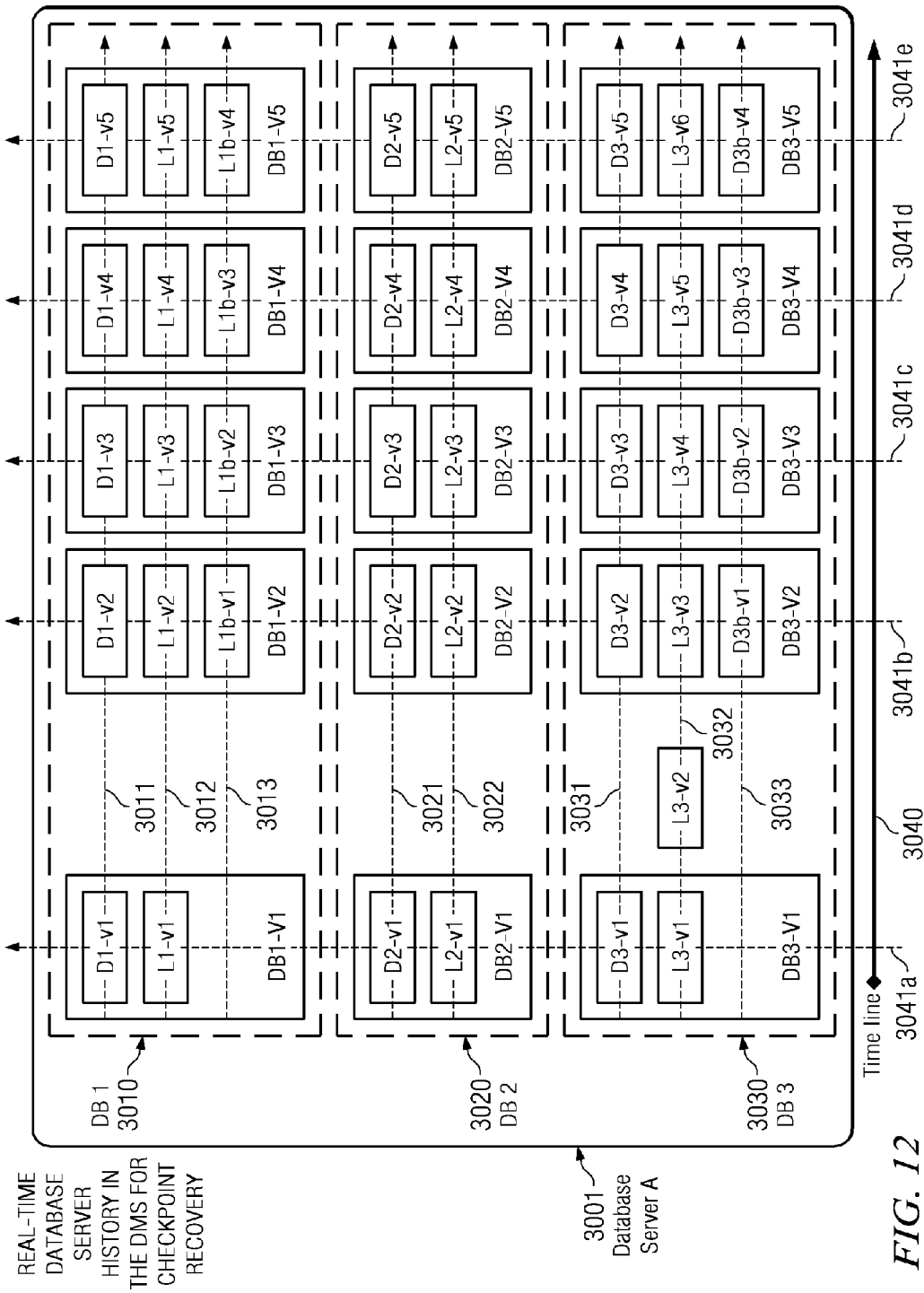
FIG. 12 is an example real-time database server history in the DMS for checkpoint recovery.
Figure 13:
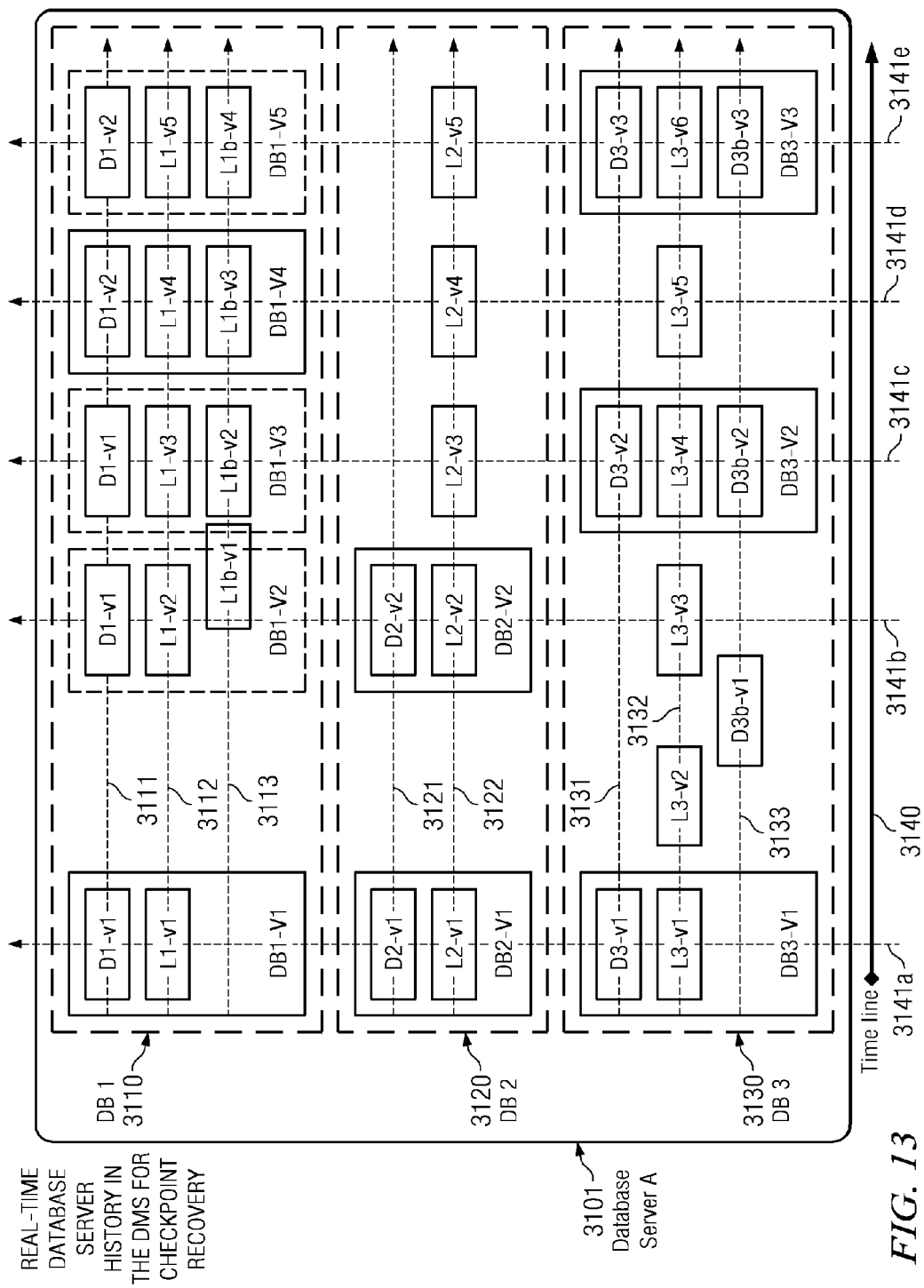
FIG. 13 is an example real-time database server history in the DMS for checkpoint recovery.
Figure 14:
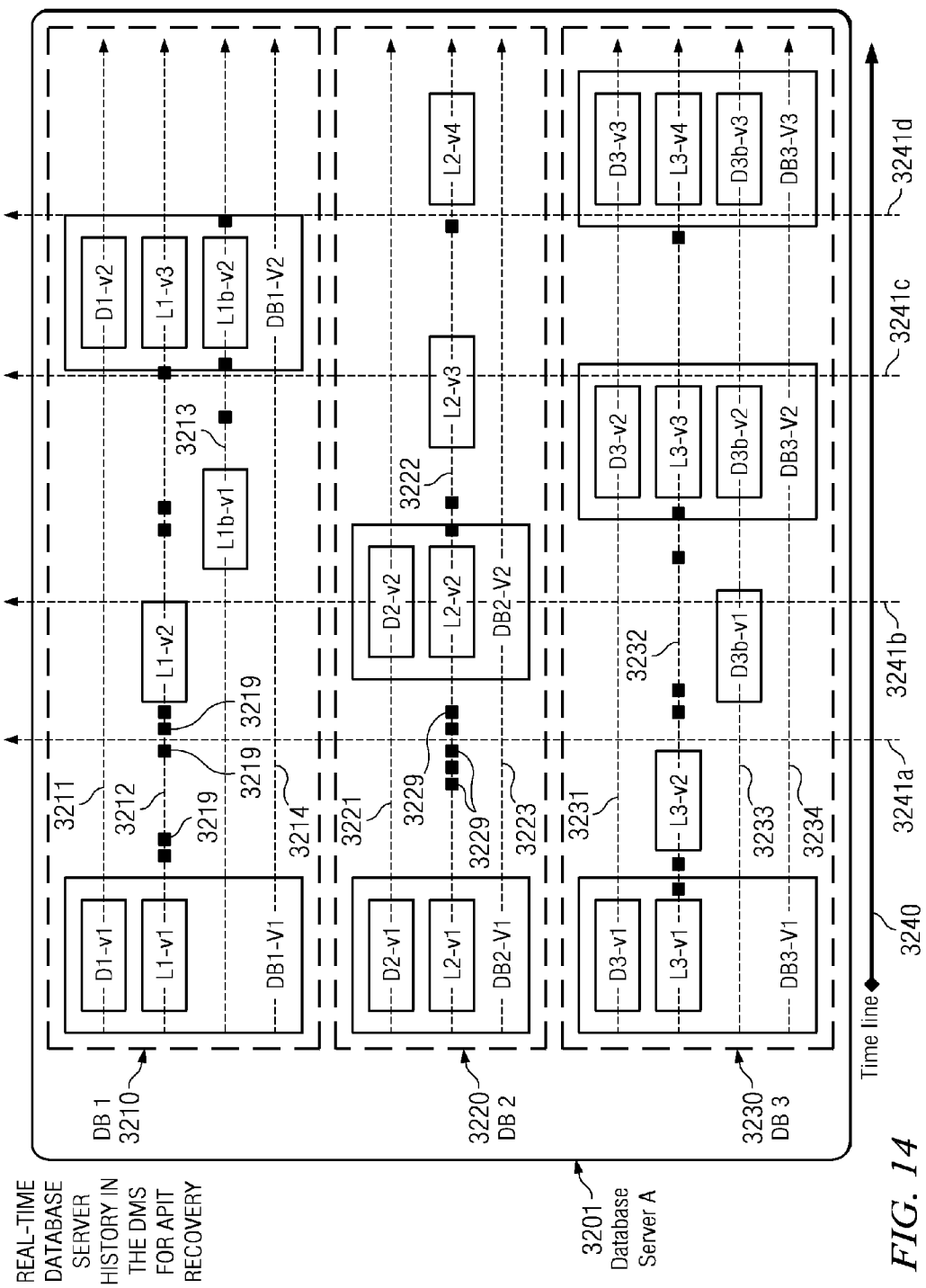
FIG. 14 is an example real-time database server history in the DMS for any point-in-time (APIT) recovery.

This disclosure is capable of creating different types of cross-consistency indexing models (i.e. consistency for the entire data source); three (3) examples are shown in FIGS. 12, 13 and 14.

FIG. 12 shows a cross database consistency index by versioning all the databases—whenever a new version is formed for one of the databases through an external event such as database checkpoint, user triggered snapshot, or host driver triggered snapshot, generation of a new version of all the other databases is triggered by the DMS at that particular point-in-time. The cross consistency model of FIG. 12 locates the consistency points at each database version boundary.

FIG. 13 shows a cross database consistency index by versioning the log objects of the databases other then the one that is being versioned due to external trigger. This means that whenever a new version is formed for one of the databases through an external event, a generation of new version of all the journal objects (log files, record files, and the associated journal groups, etc.) of all the other databases is triggered by the DMS at that particular point-in-time. The cross consistency model of FIG. 13 locates the consistency points is at either database or journal group version boundary.

FIG. 14 shows that a sequence number is entered for each journal entry and for each database version. A sequence number is also associated with a timestamp. Therefore, when a recovery point (with a given time) is decided, it can be converted to a sequence number that is closest to the given time. Cross database consistency point can then be identified by the sequence numbers entered into the databases. For example, if a database version has a sequence number N, then the consistency set would include the other databases each can be reconstituted with the most recent database version which sequence number is less then N combine with all the log entries occurs after the selected database version up to the last entry which sequence number is less then N. More details are in later sections. The FIG. 14 consistency model allows for any-point-in-time (APIT) consistency—i.e., the consistency point is indefinite (any point). An alternate indexing method can also be used by not time stamping on the sequence number, but, for example, time stamping only once for every 10 sequence numbers.

Other consistency models can be created by mixing and matching these three models. For example, an older database history may use a cross consistency model of FIG. 13 while the most recent history uses the any-point-in-time consistency model. There can also be a model wherein a first subset (of the databases) uses the model of FIG. 12 and a second subset uses the model of FIG. 13. Because the model in FIG. 12 is a superset of that in FIG. 13, the resulting consistency point is the same as that of FIG. 13.

Some property examples of this class are:

| Properties of ClsDatabase | Descriptions |
|---|---|
| Non-versioned Properties: | |
| ID | Its on GUID |
| DataSourceParent | GUID of its protection data source container |
| DateTimeCreated | Timestamp when this object is created (from the protected host) |
| Creator | The user ID of the creator |
| DateTimeTerminated | Timestamp when this object is deleted (from the protected host) |
| EventTags | List of entries with event and timestamp. The event tags may be set by users for tracking purposes. |

-continued

| Properties of ClsDatabase | Descriptions |
|---|---|
| First VersionID | GUID of the first version |
| Latest VersionID | GUID of the latest version |
| VersionCount | Total number of versions |
| Versioned Properties: | |
| ID | The version GUID of this object |
| AnchorID | The GUID of the anchor page (the ID of this object) |
| Previous VersionID | The version GUID of the previous version |
| Next VersionID | The version GUID of the next version |
| Name | Name of the database |
| DateTimeModified | Timestamp when the version is created (or when the modification occurs) |
| ModifiedBy | ID of a user who modified the directory |
| DateTimeEnded | Timestamp when this version is ended (ie. new modification results in another version being created and old version ended) |
| VersionType | Checkpoint, snapshot, etc. |
| FileCount | Number of binary and control files |
| FileList | A list of {file version GUID, type of file - control or binary, host path} |
| JournalGroupCount | Number of journal group |
| JournalGroupList | List of journal group version GUID |
| EventTags | List of event tags |
| Sequence# | Sequence number + timestamp |

These properties are example of database object schema, there can be more, or some properties in the table may be eliminated. For example one may include more properties such as data management policies, file name, metadata from the host server, and more. Because it is not the purpose of this application to discuss index and search, the index-able attribute are intentionally not mentioned.

In this embodiment, a database object has one or more journal group object(s) for managing one or multiple types of journals between two checkpoints. Each journal group manages only one type of journal. For example binary journal group contains write-ahead log files which track binary data changes associated with transactions. Yet another example is application level transaction, in term of SQL databases, it could be a journal group with a record file object that tracks all the SQL UPDATE statements that are successfully executed by the protected database server.

A database can be versioned; each version contains a set of version-able properties. When a database is versioned all its children are versioned. This allows the cross consistency model as depicted in FIG. 12 to be achieved. The journal groups of a database can be versioned without versioning a database. In this case, the binary files of the database are not versioned, but the journal groups and all its associated log and record files are versioned. This allows the cross consistency model of FIG. 13 to be realized. By including the sequence number (as a property in the database, and a record entry of the journal), the any point-in-time cross consistency model of FIG. 13 can be accomplished.

Sequence# property is used if any-point-in-time recovery (the cross consistency model of FIG. 13) is desired.

Event tag is an array of symbols or text information with a timestamp to index all events—host system events, database events (not those already indexed), network events, DMS events, user entered events, etc. For example—"quarter closing", "virus detected", "system patched", "new software installed", "data downloaded", etc. . . .

Figure 8:
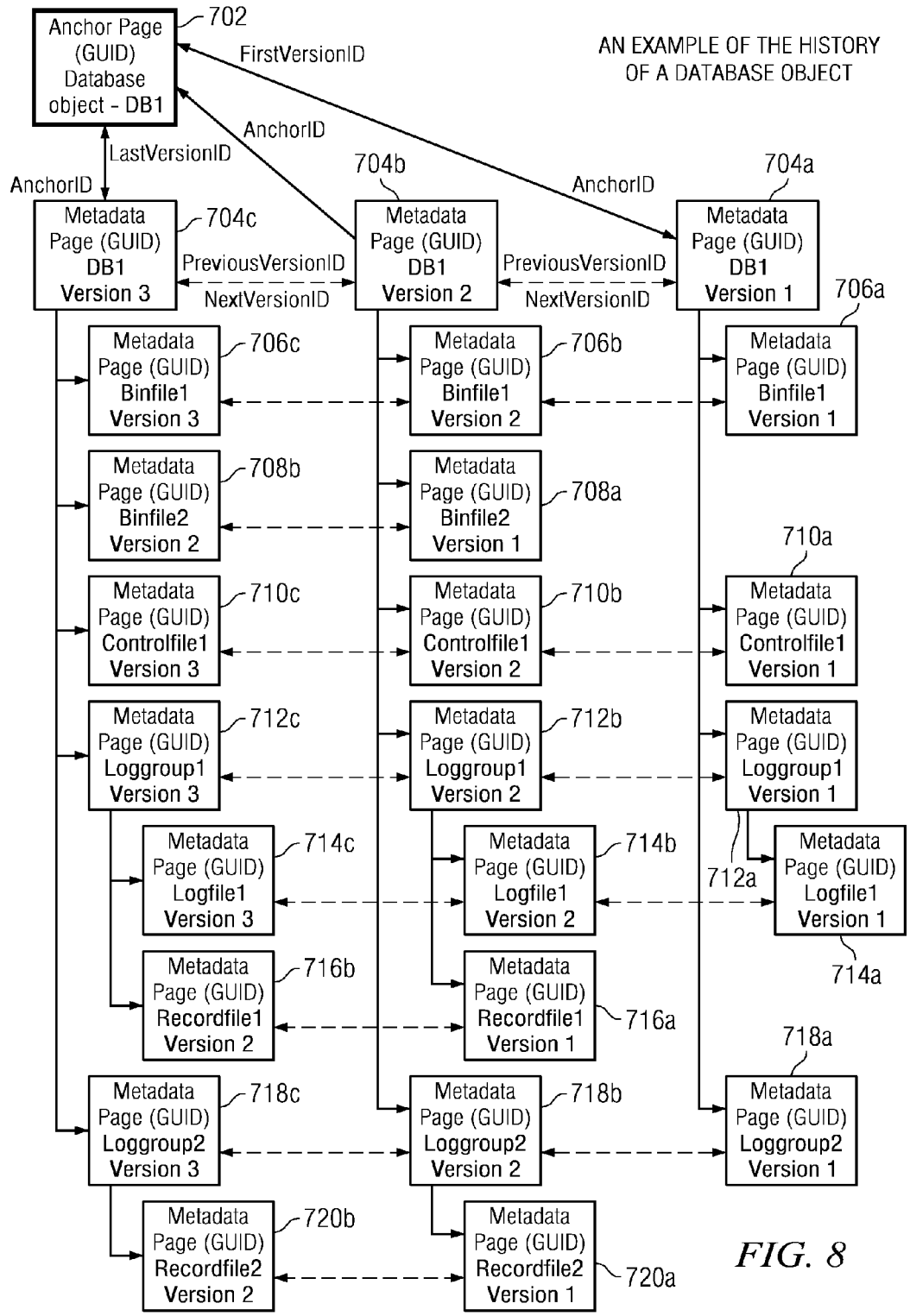
FIG. 8 is an example of the history of a database object that is created using DMS.

FIG. 8 shows an example of a database object (a child of a database data source object) with three consistency checkpoints. In this example, the database object has an anchor page 702 that contains non-version-able metadata (i.e. metadata that does not change over time, such as its ID and data source parent link), and three version pages identified by 704a-c. Within each checkpoint version, the content of the associated files or data store (if raw disks) are versioned simultaneously to form a group index. This embodiment uses object versioning to form consistent indices, there are many different ways of creating point-in-time data indices. In the diagram, only the anchor page of the database objects is shown. In this embodiment, all objects could have an anchor page. The anchor page of the file and journal objects is not shown in this illustration for simplicity reason. Further, in this example there are two binary files or raw data stores (706a-c and 708a-b)). 708a is added on the second checkpoint. There is one control file (710a-c) and two journal groups (712a-c and 718a-c). One of the journal groups (712a-c) tracks the binary write-ahead log files (714a-c). The log file is versioned at checkpoint, and the log record file (716a-b) is for tracking, or in another word, indexing transaction activities between two checkpoints. For example 716a indexes the transaction activities occurs between checkpoint 1 (database version 1—704a) to checkpoint 2 (database version 2—704b), and 716b indexes the transaction activities between checkpoint 2 to checkpoint 3. A point-in-time database state can be assembled by using the files from a closest checkpoint, and applying necessary transaction activities following the checkpoint to the desired recovery point. For example, if a desired recovery point is after checkpoint 1 occurs and before checkpoint 2 is created, the data of checkpoint 1 can be used as baseline, and part of the transaction entries in 714b can be used to roll-forwarded the data state. The portion of the transaction entries in 714b can be identified using the index in 716a.

The other journal group (718a-c) tracks SQL requests between two checkpoints. Another way to reconstruct a point-in-time data state is to use a closest checkpoint (all the database files at the checkpoint are required) and apply the necessary SQL requests recorded in this journal group to arrive at the desired state. Only one journal group is necessary for recovery.

A different embodiment is possible for any point-in-time recovery and real-time data services as long as transaction log are captured continuously or frequently, and the data set is checkpoint-ed either planned or unplanned. For any point-in-time recovery, a different embodiment is possible as long as data at a checkpoint can be indexed and reconstructed, and necessary transaction records at the write-ahead log level, application request level, or archived level can be applied to the reconstructed checkpoint.

Figure 9:
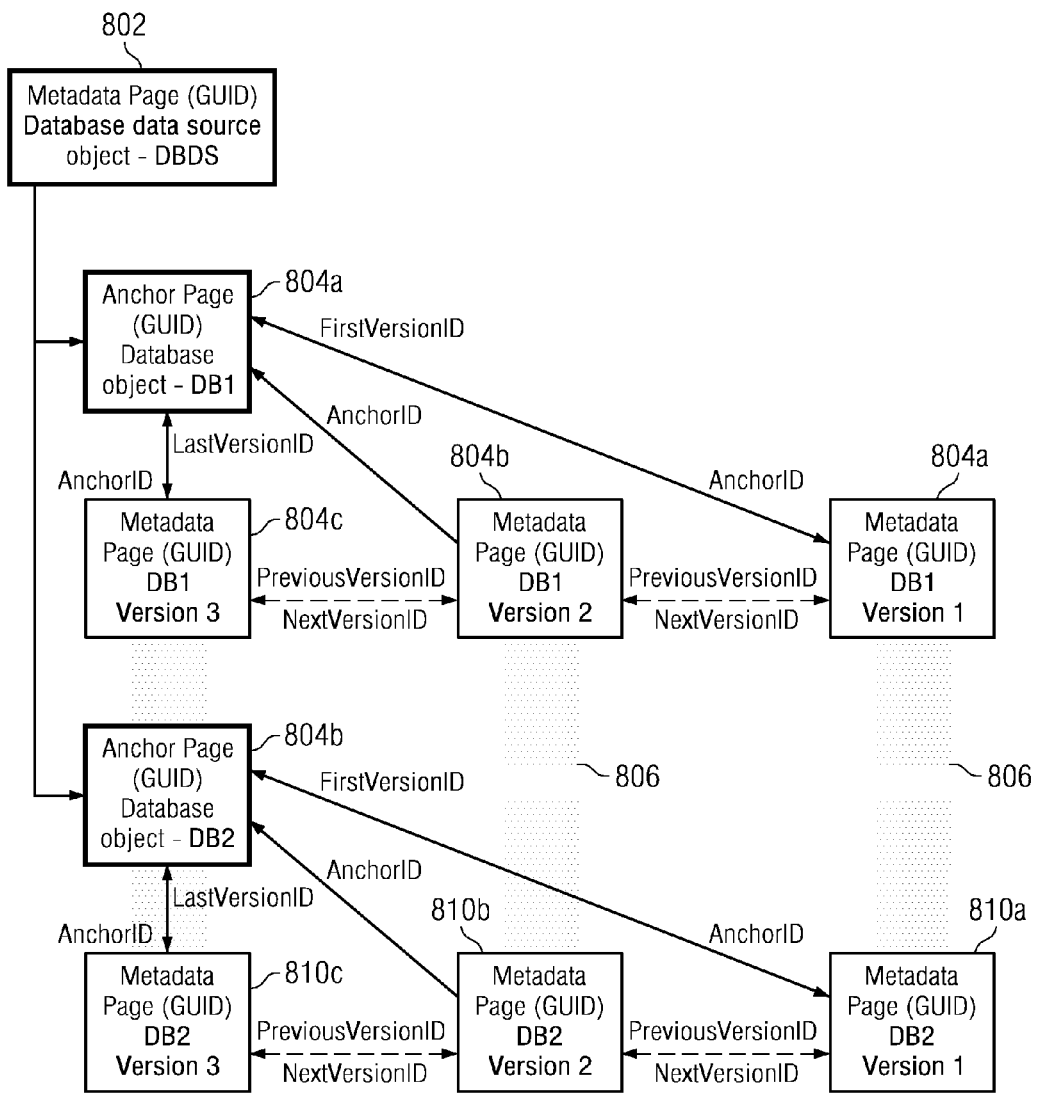
FIG. 9 is an example database data source history with two database objects using a first consistency indexing model.

FIG. 9 illustrates one database data source example based on a suggested embodiment. This illustration uses the cross database consistency model as illustrated in FIG. 12. In this model, all the related databases that belong to one data source are versioned all at once, i.e. DB1 (804a) and DB2 (804b) are versioned simultaneously when any one of the databases is versioned, e.g., due to database internal or external checkpoint, or a DMS-initiated snapshot. An external checkpoint can be initiated by maintenance scripts or DMS itself. In between versions, which is not shown in FIG. 9, the transaction activities of all databases can be sequenced so that any point-in-time state of a data source can be reconstructed with consistency and integrity.

In this embodiment, the transaction activities are tracked by journal groups which are children of the database objects. FIG. 9 shows only the database objects without its next level down in the hierarchy. The entire hierarchy of a database object is shown in FIG. 8. 804a and 804b is similar to 702, and the database versions (804a-c, and 810a-c) in FIG. 9 is similar to the database versions (704a-c) in FIG. 8. The binary files, journal groups, and log files that are not shown in FIG. 9 would be similar to those in FIG. 8.

Figure 10:
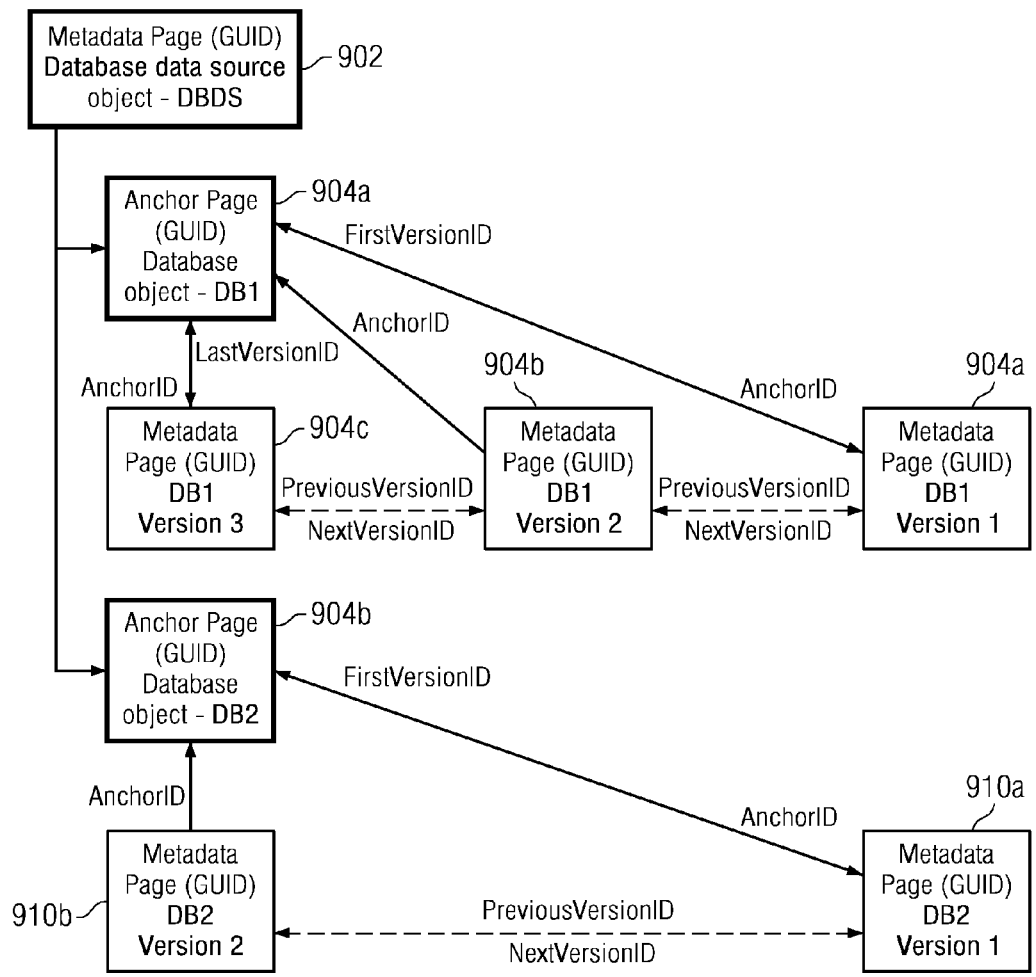
FIG. 10 is an example database data source history with two database objects using another consistency indexing model.

In this disclosure, as noted above cross-database consistency can be managed in many different ways; FIG. 12, FIG. 13, and FIG. 14 show three different consistency indexing models. FIG. 9 shows the object version view based on the consistency indexing model of FIG. 12. In this model, all databases are versioned at once (i.e., the versions are aligned, see 806), where 804a is aligned with 810a, 804b is aligned with 810b, and 804c is aligned with 810c. The object version view for consistency indexing models of FIGS. 13-14 are different than that shown in FIG. 9. In these latter two models, the versions of the individual database objects are not necessary aligned, as seen in FIG. 10. However, the activities that include database versioning, journal group versioning, and transactions, are sequenced, so that consistency and integrity across databases for the entire data source can be guaranteed.

ClsJournalGroup

In this embodiment, clsJournalGroup is a schema for tracking database activities in sequential order and to version a log file as needed. Database activities can be captured and journal in many different forms. For example, one can capture transaction requests (as SQL statements) while the requests enter a database server, one can capture transaction operations via a store procedure installed in a database server, or one can capture database update from write-ahead transaction log files. For the purpose of any point-in-time recovery, only one form of journal is enough, although a version of log file at every checkpoint is always necessary for a database recovery. After that, a journal of any form can be used to roll the database forward. An instance of a journal group is a container for storing one and only one form of database activities. This disclosure allows one or more form of database journals to be captured, stored, and indexed via multiple journal group objects.

One alternate embodiment is to simply use a directory for separating the different form of journals. Yet another embodiment is to simply save all forms of journal directly within a database object container and allow the database object to manage the differences.

Some property examples of this class are:

| Cls File | |
|---|---|
| Properties of clsJournalGroup | Descriptions |
| Non-versioned Properties: | |
| ID | Its own GUID |
| DataSource | GUID of the data source this object belongs |
| DatabaseParent | GUID of its database object |
| DateTimeCreated | Timestamp when this object is created |
| DateTimeTerminated | Timestamp when this object is deleted |
| First VersionID | GUID of the first version |
| Latest VersionID | GUID of the latest version |
| VersionCount | Total number of versions |
| Type | Type of journal |
| List of ID | Anchor ID of its log files and record files. |
| Versioned Properties: | |
| ID | The version GUID of this object |
| AnchorID | The GUID of the anchor page (the ID of this object) |
| PreviousVersionID | The version GUID of the previous version |
| NextVersionID | The version GUID of the next version |
| Name | Name of the journal group |
| DateTimeModified | Timestamp when the version is created (last checkpoint) |
| DateTimeEnded | Timestamp when this version is ended (current checkpoint time) |
| Version Type | Checkpoint, snapshot, etc. |
| List of ID | Version ID of its log file(s) if this journal group is for managing write-ahead log. Null otherwise |
| List of ID | Version ID of its record files. |

ClsFile is a schema which can be used for storing and tracking the database binary files, control files, and log files. As mentioned in earlier section, although refer as files in this section, these "files" may be contiguous raw device blocks.

The properties of this object class include the following:

| Properties of clsFile | Descriptions |
|---|---|
| Non-versioned Properties: | |
| ID | Its on GUID |
| DataSource | GUID of the data source this object belongs |
| DateTimeCreated | Timestamp when this object is created (from the protected host) |
| Creator | The user ID of the creator |
| DateTimeTerminated | Timestamp when this object is deleted (from the protected host) |
| AccessLog | List of entries with timestamp, user id, and access mode. |

| Properties of clsFile | Descriptions |
| --- | --- |
| EventTags | List of entries with event and timestamp. The event tags may be set by users for tracking purposes. |
| FirstVersionID | GUID of the first version |
| LatestVersionID | GUID of the latest version |
| VersionCount | Total number of versions |
| Versioned Properties: | |
| ID | The version GUID of this object |
| AnchorID | The GUID of the anchor page (the ID of this object) |
| PreviousVersionID | The version GUID of the previous version |
| NextVersionID | The version GUID of the next version |
| Parent | GUID of parent object |
| Name | Name of this file at this version |
| DateTimeModified | Timestamp when the version is created (or when the modification occurs) |
| ModifiedBy | ID of a user who modified the file |
| DateTimeEnded | Timestamp when this version is ended (ie. new modification results in another version being created, and old version ended) |
| Status | Consistency, DMS checkpoint, suspect |
| ACL | Key or GUID to the access control list of this object |
| Fingerprint | A hash key of the entire content (eg. could be MD5) |
| Signatures | A sequence of hash keys each is generated from a contiguous chunk of the content |
| Content | The sparse index of this version. Sparse index is byte level reference to the binary content. Binary contents are in baseline binary pages and delta pages. |
| Additional metadata and attributes | Information from the original document |

The above table is one example of what a file object may contain. One may include more properties such as a full path name, policies, etc.

The non-versioned properties include timestamp when the object is created, its creator, access journal for forensic purposes, and event tags for tracking user events across time line.

The versioned properties include name, modification information, status, ACL, and content. Whenever the name of the document changed, the content of the document changed, the ACL changed, document metadata or attribute changed, or when the document is moved, a new logical version is created. Whenever the document is deleted from the protected data source, the file object at the DMS is terminated with (DateTimeTerminated timestamped), and the last version ended.

Figure 11:
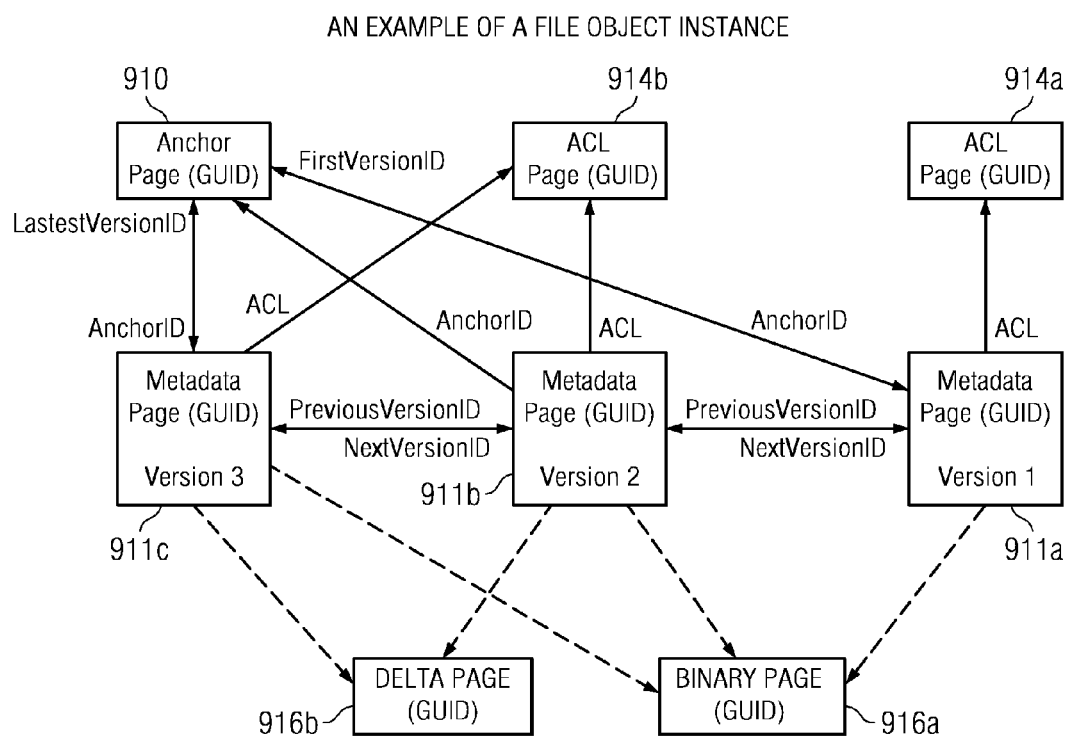
FIG. 11 is an example of a file object instance.

FIG. 11 is an example of a typical DMS file object that stores content and continuous changing history of a file from an external host server. As in a typical DMS active object, a file object has an anchor page (910) for its non-versioned metadata. This example shows a file object with three versions (911a, 911b, and 911c). The FirstVersionID and LatestVersionID properties from the anchor refer to the first and third version of the file. The AnchorID property on each version contains the GUID of its anchor page. The versions are connected into a double link list with the PreviousVersionID and NextVersionID properties on each version probably set. Each version has an ACL property that refers to the access control list. Each version page also has a pair of timestamps—DateTimeModified and DateTimeEnded to indicate when the version becomes existent and when the version is ended and a new version born. There is also a ModifiedBy property to capture the user who modifies the file. When a file is deleted, the DateTimeEnded property on the last version page and the DateTimeTerminate property in the anchor page are set to the deletion date. File version are created when a file is modified and ended when the file is closed.

In the DMS file object, on each version, preferably there is a property called "CONTENT", and this property is of the type random access binary blob. The binary value of this property type may be stored inside or outside of the metadata page. In this case, the binary data of version 1 is in the Binary Page (916a) which has its own GUID. The changes (deltas) that are made to the file for version 2 may be stored as a sequence of forward deltas in the Delta Page (916b). The changes (deltas) of version 3 may also be appended to the same delta page (916b) or another new delta page. A file object may have one or multiple binary pages. The binary pages contain the baseline data. A file object also may have one or multiple delta pages for all its changes. The sparse index refers to the data in both the baseline and the deltas to make up the content for the version. Both the Binary and Delta pages may be stored in one physical storage unit, be broken up and stored in multiple physical storage units. This is simply one embodiment of the DMS in structuring the binary data. Alternatively, each version may have its own binary pages so that no delta has to be kept. Yet another alternative is to store reverse deltas. It is not the purpose of this document to discuss the physical structuring of the binary data.

The file object structure and its metadata allows one to track a file history on what information has changed at what time, by whom, through what event, and what meaningful events to this object occur during the lifecycle of this object. This file object also optimized storage usage by using sparse index.

ClsRecordFile

ClsRecordFile is an object schema for recording a sequence of records. Each record can contain anything ranging from an event, a point-in-time reference to another object, meta-information, to raw data. The content of a record can have its own schema (definition). A journal group object may use a record file object to record a contiguous list of transactions or a list of reference to the binary transaction in a write-ahead log file. A record may contain a sequence number or a timestamp that can be useful during data recovery to identify a desired recovery point. Once a recovery point is selected, the DMS uses the closest database checkpoint for recovery, and then roll forward the remaining transactions according to a records file to arrive at the desired state.

The properties of this object class include the following:

| Properties of clsRecordFile | Descriptions |
|---|---|
| Non-versioned Properties: | |
| ID | Its on GUID |
| DataSource | GUID of the data source this object belongs |
| DateTimeCreated | Timestamp when this object is created |
| DateTimeTerminated | Timestamp when this object is deleted (from the protected host) |
| FirstVersionID | GUID of the first version |
| LatestVersionID | GUID of the latest version |
| VersionCount | Total number of versions |
| Versioned Properties: | |
| ID | The version GUID of this object |
| AnchorID | The GUID of the anchor page (the ID of this object) |
| PreviousVersionID | The version GUID of the previous version |
| NextVersionID | The version GUID of the next version |
| Parent | GUID of parent object |
| Name | Name of this file at this version |
| DateTimeModified | Timestamp when the version is created (or when the modification occurs) |
| DateTimeEnded | Timestamp when this version is ended (ie. new modification results in another version being created, and old version ended) |
| Status | Consistency, DMS checkpoint, suspect |
| RecordContentSchema | The structure of the records |
| RecordCount | Number of record entries |
| Offset | Last position for entering new record |
| Records | This may be in another page - the list of record entries. |
| Additional metadata attributes | and Information from the original document |

In each of the records, there is a record header. A record header may include sequence number, timestamp, size of the record, type of the record, and the like.

Real-Time Event Based History; Cross-Database Consistency Models

A database server may serve one database (e.g., Oracle) or multiple databases (e.g., MS SQL). When a server serves multiple databases, it is important to create and index data history with consistency tracking. As noted above, preferably one or more consistency models can be created in the DMS. In particular, in the DMS, objects and object versions can be captured and indexed to form a continuous history as illustrated in FIGS. 12, 13 and 14, each of which represent a consistency model.

The three diagrams (FIGS. 12-14) show the flexibility of the DMS object system in storing and indexing database history. One preferred technique for storing a database server history is: 1) generate an index for a database upon a snapshot or checkpoint; 2) generate an index for all the associated databases upon a snapshot or a checkpoint on one of the databases; and 3) generate an index for a transaction or group of transaction. In the DMS, note that an index can be represented by an object version, a marker, or transaction grouping. The purpose of generating an index for a database upon a snapshot or checkpoint is to preserve a consistent state of a database to be used for recovery. Generating indices for a group of associated databases (e.g., when a checkpoint or snapshot occurs) serves to preserve a group consistency state for recovery or other purposes. Indexing transactions allows for fine grain recovery in terms of time and application activity. Index can be generated for each and every transaction, or for a chunk of transactions.

As noted above, FIG. 12 shows a database data source that contains three databases. This is merely representative. Whenever a checkpoint or a snapshot occurs on one of the databases, new versions for all the databases are generated. In this case, the technique described herein may or may not generate an index for the database transactions that occur between two database versions. If the transactions are not indexed, then the recovery point would be at database versions. Note that a real-time event journal with realtime transactions of a database is forwarded to the DMS; preferably, however, it is up to the DMS to generate indices.

As noted previously, FIG. 13 shows yet another embodiment illustrating indexing of a database history. In this case, whenever a database is versioned (i.e., when a checkpoint or snapshot occurs), the journal of the other associated databases are versioned. The model shows that, for DB2 and DB3, only journal groups are versioned (see L2-V3, L2-V4, L2-V5, L3-V3, and L3-V5). For DB1, whenever a journal group is versioned, preferably its database is also versioned (see, e.g., DB1-V2, DB1-V3, and DB1-V5). During recovery time, the other databases must take a closest database version and roll forward their journal up to the journal version to recover to a particular checkpoint or snapshot. For example, to recover DB2 to 3141d, DB2-V2 can be used as a baseline, and L2-V4 journal group would be used to roll forward the state of DB2 starting from DB2-V2. In between database and journal versioning, real-time transactions may or may not be indexed; both can be achieved with the current invention. If transactions are indexed individually, any point-in-time recovery can be achieved. If transactions are indexed as a group, then recovery points are only possible at the transaction group, journal version, and database version boundary.

FIG. 14 shows a history of a database server (3201) that contains three databases (or only three of its databases are protected)—3210, 3220, and 3230. In the DMS, a clsDB-DataSource object can be used to track the database server that serves multiple databases (three in this case), and an instance of a clsDatabase object can be used to track each of the databases (3210, 3220, and 3230). A database data source object owns three database objects in this representative example. In this embodiment, real-time transactions (3219, 3229 and the rest that are not labeled) of all the databases preferably are sequenced and tracked individually. Note that the technique described herein also allows for grouping transactions and sequencing the transaction group. The granularity of transactions tracking decides the recovery time (or activity) granularity. If transactions are tracked individually, then recovery time granularity is per transaction; otherwise, it would be transaction group depending on the size of the group. In this embodiment, when one of the databases is versioned as a result of a checkpoint or a snapshot, preferably the other database is not versioned; instead, the last transaction of all the other databases up to the versioned point is marked. By doing so, consistency across all databases can be restored by assembling all the databases up to a transaction boundary. Recovering of each database is similar; first, a closest version is restored and then transactions are rolled forward as necessary up to the desired recovery point, which is marked by a transaction boundary. If recovery point happens to be at a point when one of the databases is versioned, then there is no transaction that needs to be rolled forward for that particular database.

Of course, FIGS. 12-14 show only three possible structural embodiments of the described subject matter. As mentioned, transaction level tracking can be applied to the structure as shown in FIGS. 12 and 13.

In addition to storing and tracking database server history in real-time with guaranteed consistency cross multiple databases and guaranteed integrity upon recovery, the same indexing can be applied to tracking multiple related database server history. Events and data changes of multiple related databases from multiple servers can be tracked and streamed to the DMS in the original order as they occur. The technique described herein can apply the same technique to index and store the database history and guarantee consistency across multiple database servers for the purpose of data recovery.

Protecting a Database Server in Real-Time; Generating Real-Time Event Based History FIG. 14 is a high level flow diagram that illustrates the end-to-end process of a DMS protecting a database server—from DMS host driver to the node. In this case, the process of the DMS host driver in 3302 first queries the database server to generate a sequence of database object creation events to upload the initial baseline of the database. While uploading, the DMS host driver also captures database activities in real-time as part of the process in 3302 and streams the real-time event journal (RTEJ) to a DMS node. The real-time data capturing is as described above. The creation event can also be generated after initial upload is completed when new files or storage devices are added to the database server. Files and storage devices can also be removed (terminated) when a database administrator restructure a database server.

Figure 18:
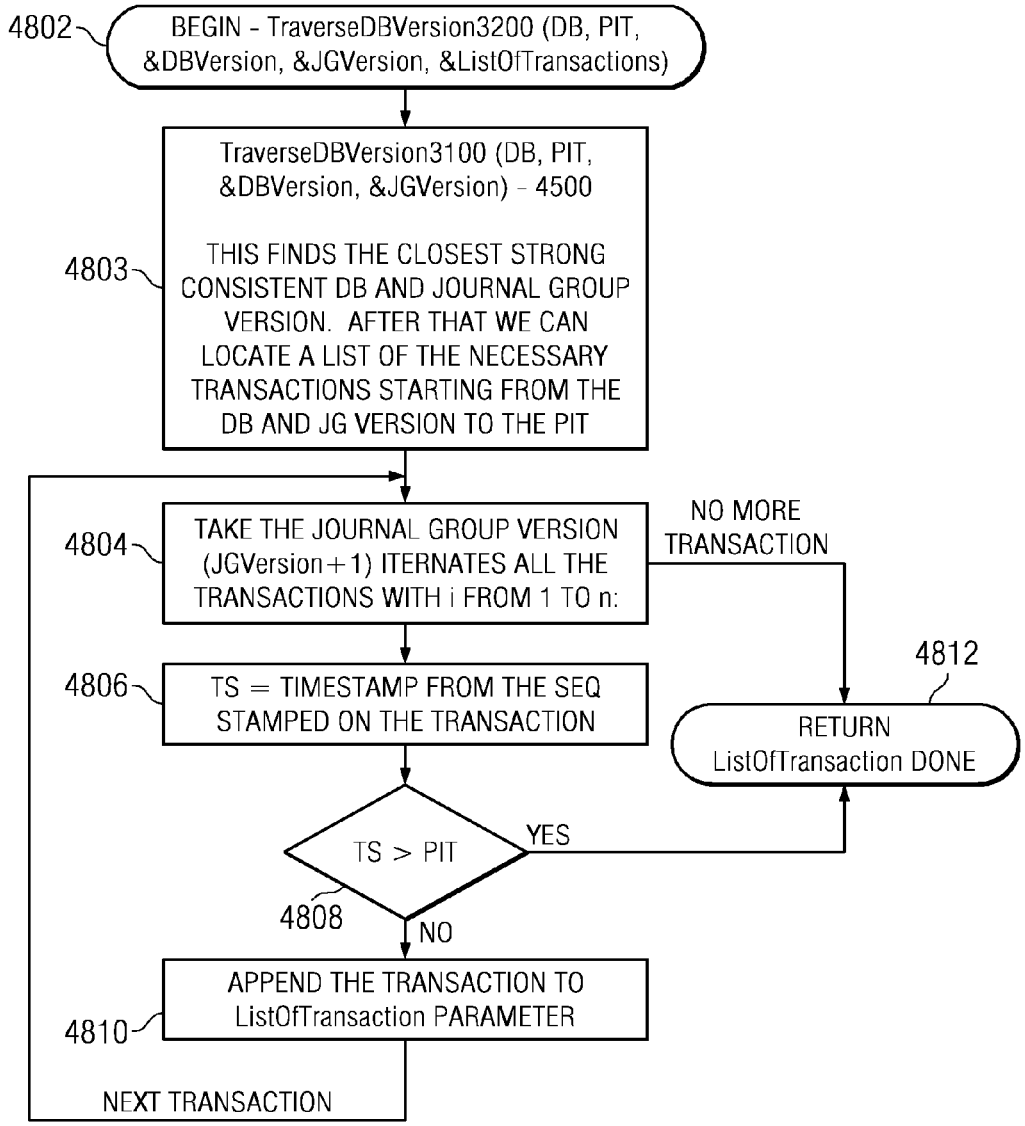
FIG. 18 illustrates a process to traverse a continuous history (with a third consistency model) of a DMS-protected database source to locate the data state at an exact point-in-time.

When the real-time event journal stream arrives at a DMS node, the event that is associated with the changed data and metadata is examined, at step 3304. Depending on the event type, the associated data, metadata, along with the event are dispatched to the appropriate process, as seen in FIGS. 15, 16 and 18 described below.

DMS Database Object Creation Process

This process handles CREATE events.

Figure 15:
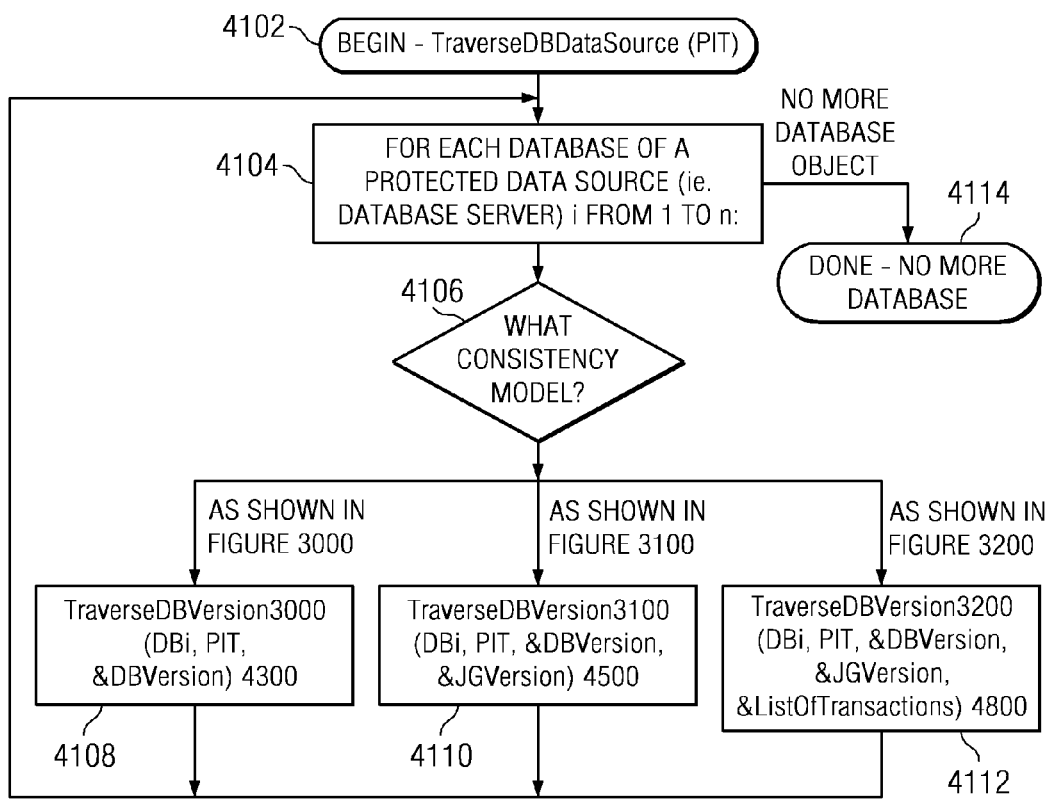
FIG. 15 illustrates a process to traverse the history of a DMS database source to locate the data state of all its databases at a given point-in-time.
Figure 16:
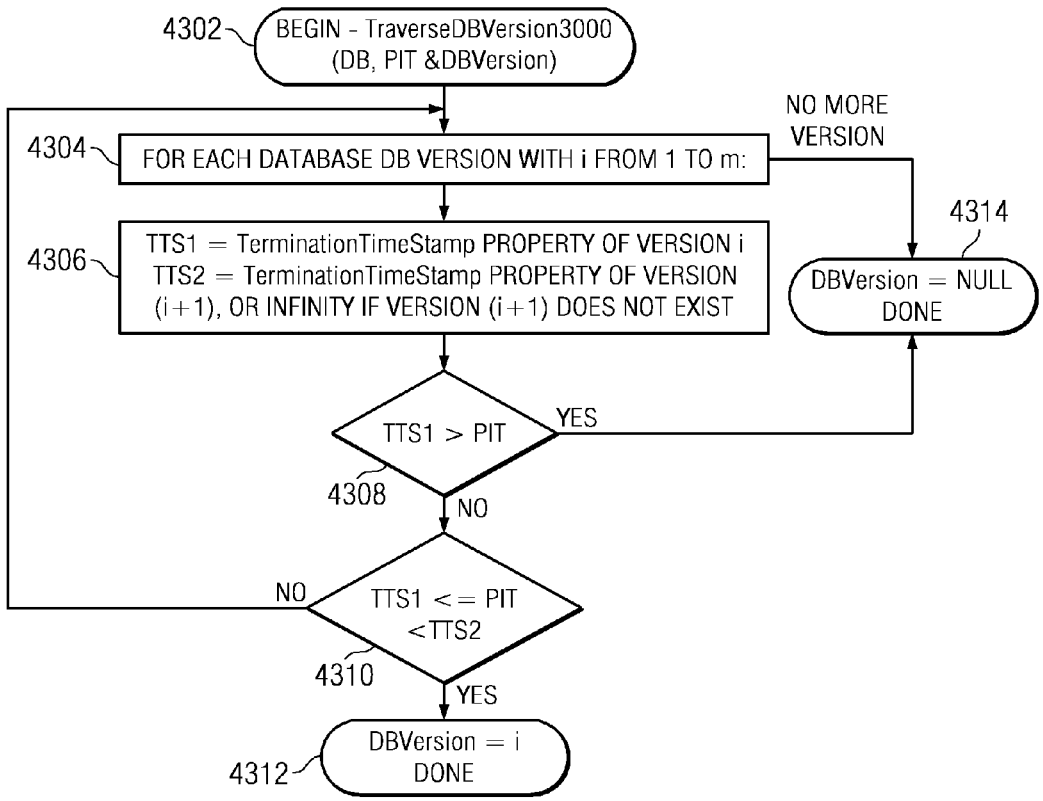
FIG. 16 illustrates a process to traverse the history (with a first consistency model) of a DMS-protected database source to locate the data state right before the given point-in-time.

The process in FIG. 15 is for creating database objects. Database objects are created during initial upload and during regular protection time when a new database is added to the protected server, or when a new database file (binary, log, or control file) or a storage device is added. A database administrator can also add new transaction tracking with DMS, in which case, new journal group and record file object may be added.

Step 3404 determines what type of database object to create. For initial upload, a new data source object (the root container) must be created by the host driver 3406, as a resulting data source creation is at the very beginning of the real-time event journal stream. In the DMS, a data source object saves the meta-information of a database server. For database initial upload or when new database is added to a protected database server, a database CREATE event is forwarded and handled by the DMS (3408, 3410) to create the database object. A first version of a database is automatically generated (and remain open) once it the database is created, and anchor and the first version is linked to its data source parent (of the protected server) as indicated by the metadata. Steps 3412 and 3416 create data objects for storage history of databases. First version of the file is also created. A DMS file object can capture content in a database file or raw storage device. A database file may be a database binary file, or a control file. A file object is created during upload or when new file or storage device is added to a database. A database can have multiple binary or control files. Once created, the first version of the file object is linked to the latest version of its database parent. Steps 3418 and 3420 create a journal group object. At initial upload, a journal group object is created as a container for the binary log file(s). During runtime, user can create more journal group (container) to track database activities in many different levels, for example, in SQL transaction level. Same as the other object, a first version of the object is created and link to the latest version of its database parent. Steps 3422 and 3426 create record file object or log file object (log file object is simply a file object). Record file is for tracking granular transaction records, or binary transaction record boundary in the binary log file. A first version is created and the object is tight to the latest version of its journal group. Once created, the DMS object remains open for content to be uploaded and modified, as seen in step 3428.

DMS Database Object Modification Process

The following description relates to FIG. 16.

This process handles all modification events such as RENAME, MOVE, CHECKPOINT (begin checkpoint and end checkpoint), TRANSACTION, WRITE LOG, LOG ALTER, LOG ROLLOVER, WRITE BINARY, SET metadata, BINARY DELTA, and so on. Step 3503 verifies that the target object of the event existed. Step 3505 handles OPEN event by opening the target object 3506. Step 3507 verifies that the object to be modified is opened. After that 3508 dispatches the event to the appropriate event handler. As shown in earlier sections, when a database snapshot is created, or when a database server performs an internal checkpoint (memory flush) a full consistent database is captured and versioned. During which all the binary and control files, all the log groups, and the log and log record files of a database are versioned. When a consistent database version is generated (indexed), it represents a point-in-time when the database is strong consistent state (example: see 3041a-e of FIG. 11, DB3-V1-V2 at 3141a and 3141c of diagram 3100). The earlier sections show that the DMS can track database history in three different consistency models (FIGS. 11-13) when a database server has multiple databases.

Also, as indicated in earlier section, between two database versions, real-time log can be tracks (e.g.: L3-V2 of diagram 3000, 3219, 3229 of diagram 3200) in such a way that when a point-in-time recovery is necessary, a previous database version prior to the recovery point, along with the additional log entries happen after the database version but up to the recovery point can be combined to reconstruct database. The recovery is done by rolling forward the additional transaction entries using a database (a fully versioned) with a strong consistency state as baseline. Therefore, database binary and control files changes are accumulated and versioned when a database version is created. For example, see FIG. 13. For the recovery of DB2 to a point-in-time before 3241*a*, the baseline DB2-V1 can be used to roll forward part of the transactions in 3229. In step 3522, when BEGIN-CHECKPOINT is received by the DMS node, immediately the DMS closed (versioned) all its journal groups and their associated log and record files. At which point, if the consistency model is 3000, all the other databases that are served by the same database server are also versioned—see 3041*a-e* of FIG. 11. If the consistency model used is FIG. 12, then the journal groups and all their associated log and record files of the other databases of the same database server are versioned—see 3141*a-e* of FIG. 12. Once a version of the journal group, log, and record files is closed (versioned), a new version is opened for capturing new updates. Transaction records are captured by step 3516.

All the updates and metadata changes to the binary and control files are captured, stored, and indexed by step 3514. This step handles the update events such as SET, WRITE, and DELTA (DMS host driver sends this event in case it performs delta reduction to the original WRITE event). In this step, data may be delta-reduced or compressed, and byte level indices are generated to prepare the data in a recovery ready format. If there are queuing, caching, and that binary data updates are delayed and sent after the actual SNAPSHOT and database internal CHECKPOINT event, DMS accounts for this by sending an END-CHECKPOINT event after all the binary and metadata updates for a database version are forwarded to the DMS. When END-CHECKPOINT is received, step 3520 handles it by immediately versioned (closed the active version) and indexed the database, the binary, and control file objects. A new version of all these objects is created and ready to capture new changes after the checkpoint.

All the transaction records (TRANSACTION event), changes to the structure of a log file (LOG ALTER), or when a log file is rolled over (ROLLOVER), as well as all the events that associated with log files, step 3516 handles it by capturing the associated changes to the log or record files. For consistency model 3200, each transaction or a group of transactions (the granularity is flexible) is time-stamped along with a transaction sequence number. Transaction sequence number is issued by data source object. In this flow diagram (does not have to be done this way), a SEQ event is generated, and separate step 3518 then queries the data source object to obtain a sequence number and timestamp for the log or record files.

When the consistency model of FIG. 11 or FIG. 12 applies, and when a database among a group of databases that belong to a database server is versioned in the DMS, the appropriate database objects of the other related databases are also versioned. For consistency model of FIG. 11, the entire database object set (all the binary, journal group, log, and record files) of the related databases are versioned. In the case of FIG. 12, only the journal groups and the associated log and record files are versioned. The MAKE-VERSION event is self generated in step 3522 and handled in step 3524. Database files can be moved and renamed during run-time, and those events are handled by 3512. In which case, the associated object metadata is changed. When a database is detached from it server, or when a database server is shutdown, the associated database files are closed. The CLOSE event is handled by step 3510, in which, the last version of each of the database objects is closed (i.e., versioned). New database files and storage devices can be added in runtime. The associated DMS objects are created according to the process shown in FIG. 15 and modified according to the process shown in FIG. 16.

DMS Database Object Termination Process

There are many different kinds of termination event. These events are handled by the process shown in FIG. 18. Step 3604 dispatches the event to the right process accordingly. The DESTROY event can only apply (generated by users) when a DMS database object is no longer active—not protecting a database server and not involves in any replication. If the data source is not idle, step 3614 will report an error. This event instructs the DMS to remove the target database object from the DMS object storage for good—all its history is erased as handled by step 3614. The parent-child link between the database and its data source is disconnected. Users can also generate a DESTROY event to a DMS data source object if it is no longer active. The data source DESTROY event is also generated by users and handled in step 3612. This step uses 3624 to destroy any remaining database objects and then permanently remove the data source object with its entire history from the DMS.

During runtime, in a database server, a database can be deleted from a database server. When DMS host driver detects the database deletion event, it sends a TERMINATION event to the DMS. In step 3610, when database TERMINATION event is received, the last version of the database and all its binary and control files, all its journal groups and their log and record files are all closed. The last version of these objects is time-stamped. From this point on, there will be no more history for the database as it will no longer exists. This is very different then DESTROY event, as DESTROY event removes the entire history from the DMS. TERMINATION event only stop the history from continuing.

An administrator can add different level of transaction tracking which translate to the addition of DMS journal group. An administrator can also remove the tracking of some transaction, in which case, the associated journal group is removed. This user action translates to a journal group TERMINATION event, and it is handled by 3608. When a journal group is terminated, the last version of the journal group and all its log and record file children is time-stamped and closed. There will be no more continuous history for these objects from this point on.

Although not shown in FIG. 18, if a database is restructured and its file is deleted, the last version of the file will be terminated in the same way as the journal group. It is not shown in the flow diagram because the individual file of a database in most databases is never deleted unless the entire database is deleted.

Traversing a History to a Former Point-in-Time; Assured Consistent and Integrity This section describes: 1) traversing (for recovery) at database checkpoints, and then 2) traversing database at any point-in-time, and 3) traversing (for recovery) at any point-in-time with guaranteed consistency and integrity (uncorrupted and guaranteed usable files).

Once a database history is captured and indexed in the DMS continuous object store, a point-in-time data state can be traversed. The traversal process differs depending on the consistency model applied on the indexing and versioning of the database history. The capability of traversing the data state at any point-in-time in the past allows the DMS to recover a corrupted database or missing database information.

FIG. 15 illustrates the traversal of the database state of a database data source (e.g., the data set of a database server) as of a given point-in-time (PIT).

For a database server with multiple protected databases, the traversal preferably is handled one at a time, either sequentially or in parallel, as shown in 4104, until all the databases are traversed 4114. The traversal process is different depending on how the database history is indexed, 4106. For the consistency model of FIG. 12, the traversal process is shown in FIG. 16; for the consistency model of FIG. 13, the traversal process is shown in FIG. 17; and, for the consistency model of FIG. 14, the traversal process is shown in FIG. 18.

As previously mentioned, the DMS is used to index data and metadata history at any time granularity so as to allow recovery to any point-in-time in the past. The capability of this technique is illustrated in the consistency model of FIG. 14. The consistency models of FIGS. 13-14 are used to illustrate the flexibility and extensive indexing capability of the disclosed technique. As previously noted as well, these two consistency models only allow checkpoint (selected time point) indexing; these models typically do not index transactions continuously (instead only database checkpoints are indexed). As a result, the consistency models of FIGS. 13-14 only allow recovery to any former database checkpoints, not exactly any point-in-time. The recovery point limitation of the consistency models (FIG. 12 and FIG. 13) is by indexing choice, and is not a limitation, however.

As noted above, FIG. 16 illustrates a process for traversing a database history of a given database (DB) that is indexed with the consistency model of FIG. 12. In this case, the index granularity is at database version level. When traversal is completed, the particular database version that is closest (right before) to the given point-in-time (PIT) is returned in the DBVersion parameter, 4302. In operation, the process shown in FIG. 16 examines all the database versions until the last version (4304, 4306, 4310, and 4314), or until the timestamp of the next database version is beyond the given PIT (4304, 4306, 4308, and 4314). If a version of a database created right before the given PIT is located, its version number is set on DBVersion (4310, 4312) and the traversing ends. Otherwise, the next database version is examined (4310, 4304).

Figure 17:
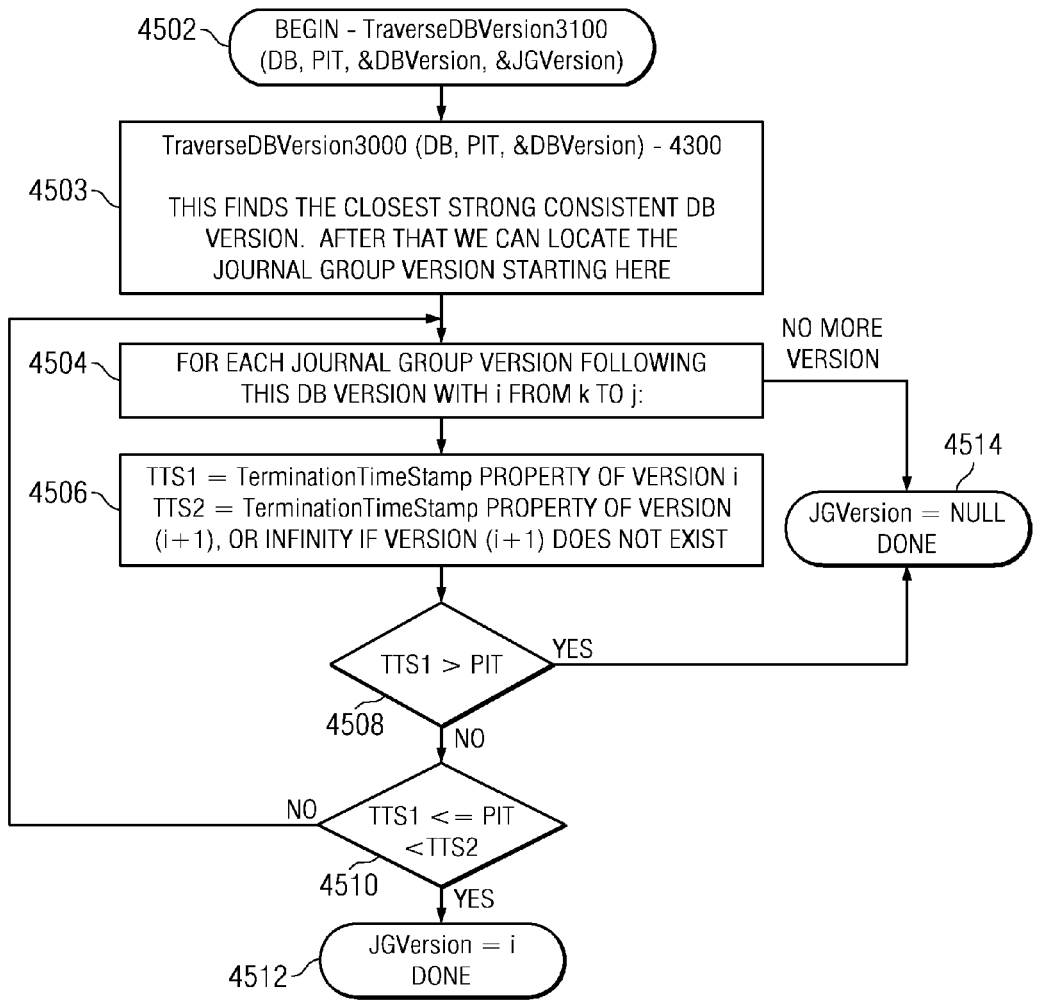
FIG. 17 illustrates a process to traverse the history (with a second consistency model) of a DMS-protected database source to locate the data state right before the given point-in-time.

FIG. 17 illustrates the process for traversing a database history of a given database (DB) that is indexed with the consistency model of FIG. 13. In such case, preferably there are two levels of indexing, a first level of indexing is at database version level, and a next level (sub-index) is at Journal Group level. When traversal is completed, the particular database version that is closest (right before) to the given point-in-time (PIT) is returned in the DBVersion parameter, and the journal group version that is closest (right before) to the given PIT is returned in the JGVersion parameter, 4502.

The process in FIG. 17 traverses the database history of a given database (DB) to locate the closest database version (DBVersion), and its closest journal group version (JGVersion) to a given point-in-time (PIT), 4502. The database version is set in DB Version parameter upon completion of the process, and the journal group version is set in JGVersion parameter. For recovery purposes, one can use the files in the database version as baseline, and the journal group transaction log or record files in the journal group version to roll forward the database state. For example, in FIG. 13, to recover DB2 to 3141d, DB2-V2 can be used as a baseline, and L2-V4 journal group would be used to roll forward the state of DB2 starting from DB2-V2.

The process uses the routine of FIG. 17 to locate a database version that is the closest to the given PIT, 4503. Once the database version is located, the subsequence versions of a journal group of the database is examined, 4504. Only those journal group versions that are created after the desired database version and before the next database version need to be examined. The journal group versions are checked until there is no more version (4504 and 4514), or until the timestamp of a journal group version passes the given PIT (4508 and 4514). If a journal group version that is closest to the given PIT is located, JGVersion is set to that journal group version number (4510 and 4512). It is possible that no journal group is found, in which case the desired traversal point (or recovery point if the traversal is for recovery purposes) is at the database version, and there is nothing to roll forward.

A significant advantage of the described technique is the capability to provide data, metadata, and any point-in-time event indexing. The flexibility of the tracking and indexing (versioning and timestamping) of the described technique is demonstrated in FIG. 18, wherein a database state (DB) can be traversed at any given point-in-time (PIT) and at the exact PIT (not the closest roundup). In this case, a closest database version as baseline is located and returned in DBVersion, a closest journal group (for rolling forward in case it is used for recovery) is located and returned in JGVersion, and finally a list of necessary transactions following the journal group version up to the exact PIT is gathered and returned in listOfTransaction parameter, 4802. Those transactions then are used for further rolling forward the database state to the exact PIT if recovery is desired.

In the process shown in FIG. 18, in step 4803, the process of FIG. 17 preferably is used to locate the closest database and journal group version. After that the transactions following the last journal group version are examined (4804), until all transactions are examined (4812), or until the timestamp of a next transaction is beyond the desired PIT (4808 and 4812). If a transaction is recorded before the given PIT, the transaction is added to the list (4808 and 4810). This process locates a database baseline (DBVersion), the next transaction log checkpoint (JGVersion), and the necessary list of transactions occur after the checkpoint up to the desired PIT (ListOfTransaction). This process demonstrates the full capability of the current invention, in particular, the capability to structure real-time data history for track data changes, metadata, and events, and to index all these events associated with the data in real-time continuously, as well as to enable the traversal and recovery of a database to any point-in-time in the past with guaranteed consistency.

Figure 19:
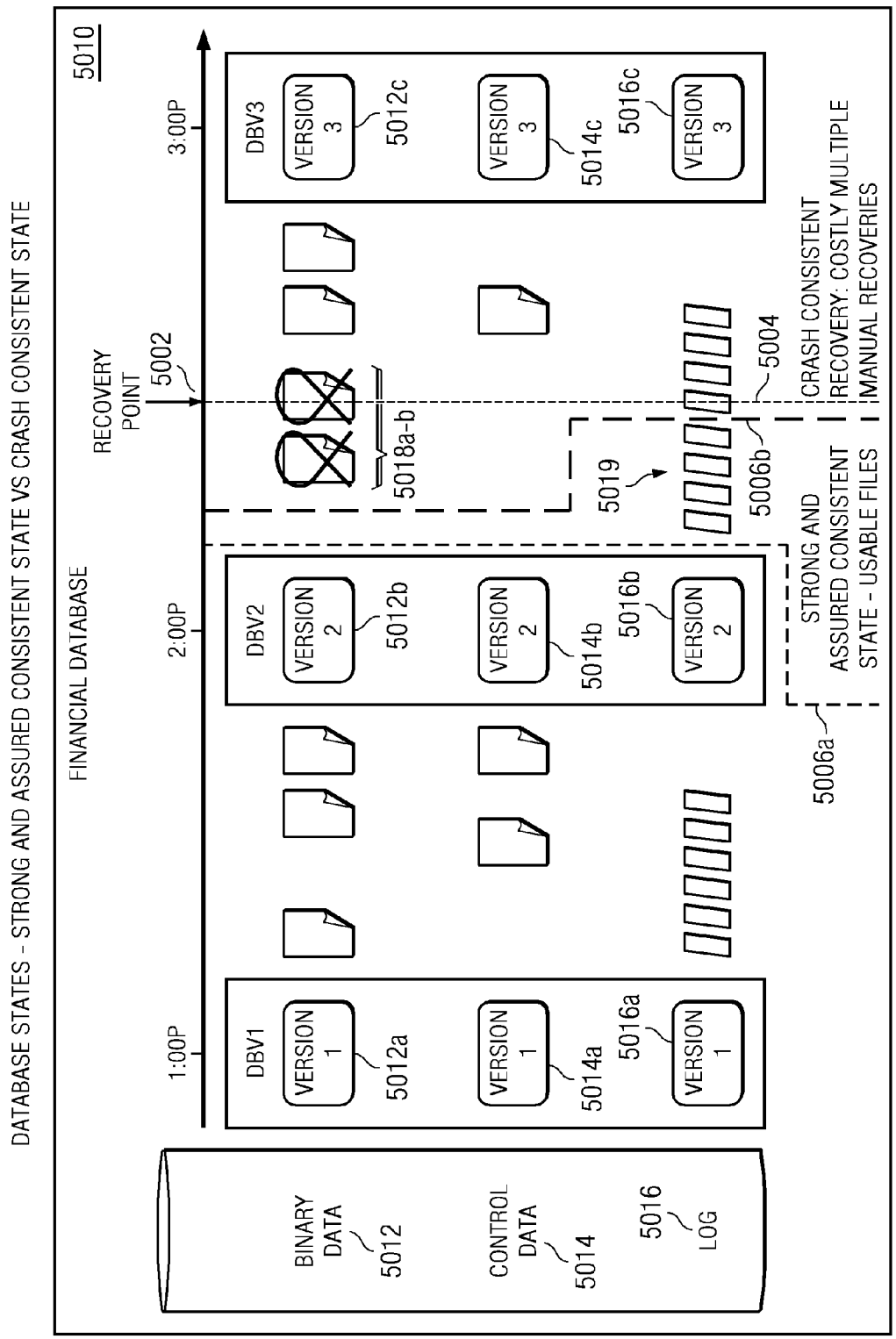
FIG. 19 illustrates two database states.

As mentioned in a previous section, during runtime, preferably database transactions are entered into the transaction log file(s) as or before the transactions are processed. The updates to the binary and control data files may be delayed and flushes out randomly. When a database performs an internal checkpoint, it flushes all its memory at which moment, all the database files are guaranteed with strong consistent. Database checkpoint can also be triggered externally through a CHECKPOINT SQL request, or through a storage snapshot request. FIG. 19 shows three database checkpoints (at 1:00 PM, 2:00 PM, and 3:00 PM). DMS generates database version when a database checkpoint is detected (DBV1, DBV2, and DBV3). At each database version, all the files belong to the database are versioned (as a way for indexing at that consistent event).

As mentioned, during runtime binary changes to the database binary files are likely to be cached in memory, and flush out randomly. So, at any moment in time, in the persistent storage, the data state of the binary, control, and the log files are not in consistent because part of the changes to the database binary files are not yet written to the storage. Traditional replication or Continuous Data Protection (CDP) solutions are designed to record all the updates to the persistent storage continuously in real-time rather then using the database event for indexing. As a result, when recovery is necessary, these solutions are only capable to recover to the recovery point (5002) as indicated in FIG. 19. At that point, the data state these solutions are capable of reconstructing is a crash consistent state 5004, which the state of the log file(s) out of synchronous with the state of the binary and control files. This crash consistent state may be repaired by a database server or a database tool to bring the state of all the files to a consistent state if recovery is desired. Repairing a database is a time-consuming process; it is also possible that a repair may fail, therefore, recovery to a crash consistent state does not guarantee usable files.

In contrast, the DMS indexes (versions) a database checkpoint by generating database versions—DBV1, DBV2, and DBV3 (so as the database files). It also sequences, timestamps, and indexes the transaction activity in the transaction log. When recovery is desired, a strong consistent database baseline version is first recovered, and then the necessary log files and transaction activity are used to roll the state of the database forward. In the above example, 5006a is one strong consistent data point when a database version (checkpoint) can be recovered. Another example is 5006b when the recovery point 5002 is desired. In the 5006b example, DBV2 with strong consistency is used as baseline, and the list of transaction 5019 is used to roll the database state forward. Because the state of the binary updates 5018a-b is unknown, DMS discards those updates for that recovery point. DMS always starts recovery at a strong consistent baseline and rolls forward with a valid transaction; thus, it can reconstruct a database to any point-in-time with guaranteed data consistency and integrity (guaranteed usable files).

Near Instantaneous Recovery to a Previous (or Latest) Point-in-Time

Figure 20:
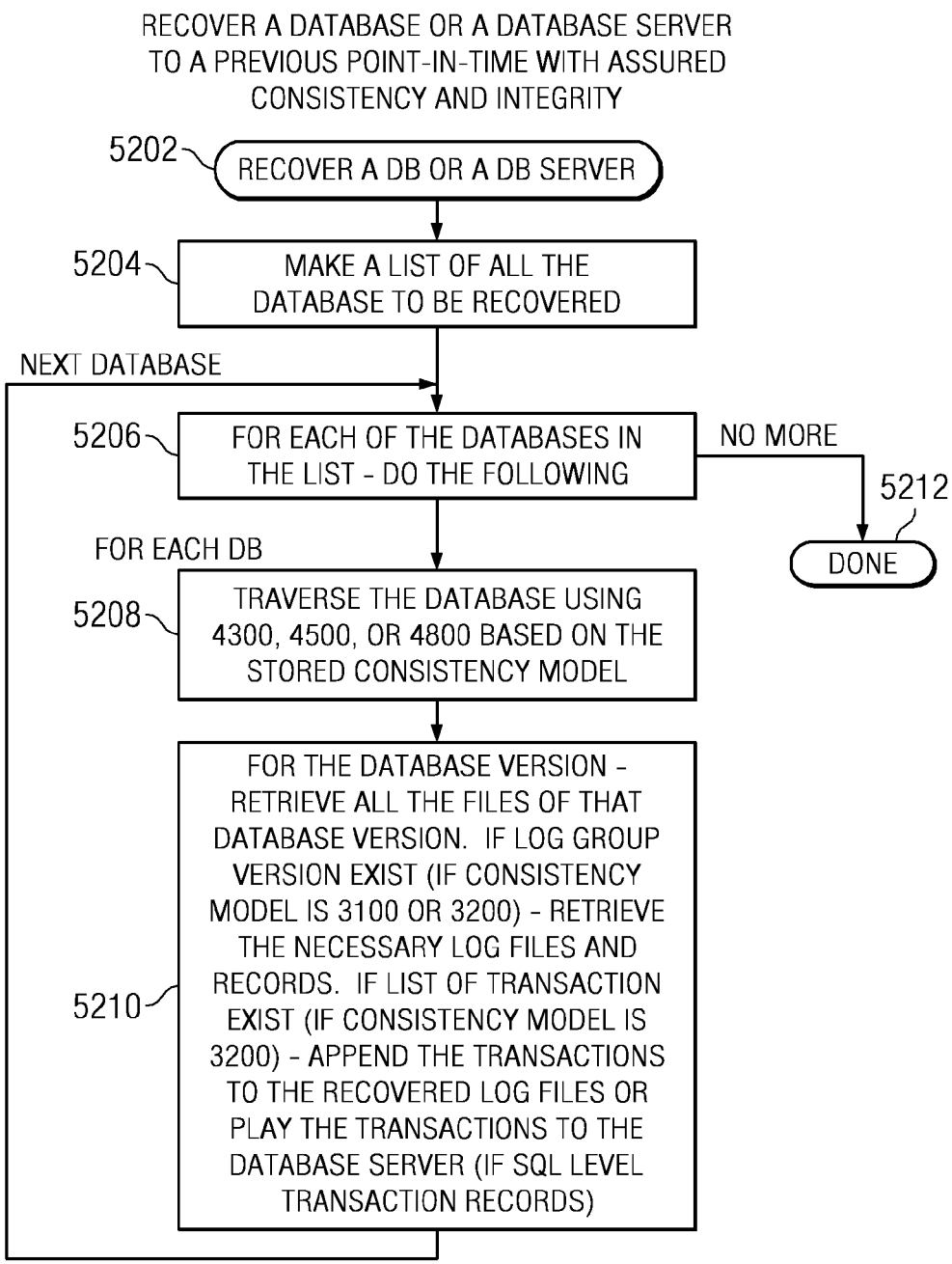
FIG. 20 illustrates a process to recover a database or database server to a previous point-in-time with assured consistency and integrity.

The flow diagram in FIG. 20 illustrates the steps to recover a database or database server using the captured database history in DMS to a former point-in-time with guaranteed consistency and integrity.

The process begins with making a list of database to recover from the given database or database server, 5202 and 5204. For each of the databases to be recovered (5206 and 5208), traverse the data state using process 4300, 4500, or 4800 depending on the consistency model used for indexing the database history. In step 5210, for each database, once the database version, journal group version, and list of transactions are obtained, create the necessary files in the recovering server, retrieve the content of the files at those located versions and recover to the recovering files. If journal group and/or the list of additional transactions exist, then those log files and transactions are used to roll forward the state of the recovering database. If consistency model 3200 applies, then the DMS recovery process recovers a database or a database server to any given point-in-time in the past with guaranteed data consistency and integrity. The process iterates until all the necessary databases are recovered 5212.

Because the DMS indexes events (in particular consistency events) along with the associated changed data and metadata, it is capable of reconstructing a database state to any point-in-time in the past with guaranteed consistency and integrity. There is no need for database repair once the data is recovered; the recovered files are guaranteed usable by a database server. With such assurance, the current invention can be combined with a prior disclosure, virtual-on-demand recovery as described in Ser. No. 11/185,313, filed Jul. 20, 2005, to provide instantaneous database and database server recovery. The combined subject matter allows a database server regardless of data set size, to be recovered to any point-in-time and begun serving (both reads and writes) its application within seconds.

Figure 21:
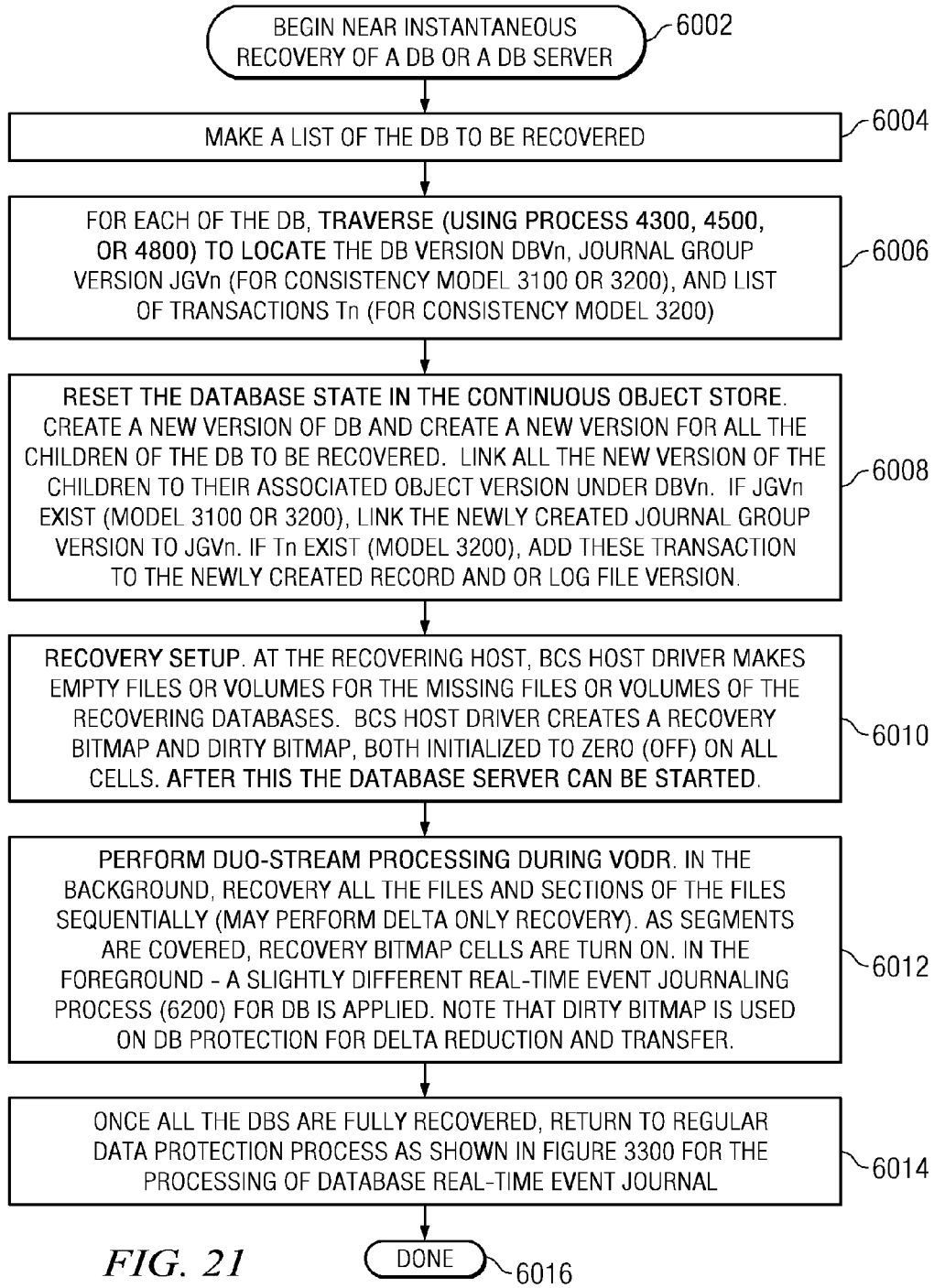
FIG. 21 illustrates a process for near instantaneous recovery of a database or database server to a former desired point-in-time.

FIG. 21 illustrates the process to recover a database or a database server near instantaneously. In step 6004, a list of databases to be recovered is put into a list. Then, for each of those databases, in step 6006, the desired recovery point is traversed using routines of FIG. 16, 17 or 18. In step 6008, once the recovery point is located in the data history (DBVersion, JGVersion, and a list of transactions), a new version of the database object, and a new version all the database files are generated. The new version of all the database binary and control files are linked to their associated version exists in the DBVersion. The new version of all the journal group and journal group files are linked to their associated version exists in the JGVersion (or DBVersion if JGVersion is null). If a list of transactions for reconstructing the data set state to the exact point-in-time exist, then those transactions are appended to the last version of the journal group. This step essentially resets the data history in the DMS to make the most recent data state to be identical to the desired recovery point.

After the data state is adjusted in the DMS in step 6008, recovery at the destination host server begins in step 6010. In this step, the missing recovering database files or volumes are created empty. If the files or volumes existed, delta recovery can apply so there is no need to delete them—this is optional. After which, the host driver creates a recovery bitmap and dirty bitmap for all the recovering files and volumes. Each cell in the bitmaps represents a segment of a file or a volume. The cells are all set in an OFF state initially. The OFF state in recovery bitmap means that the segment of the file or the volume has not been recovered yet, while OFF state in the dirty bitmap means that the segment has not been modified. After this step is completed, the database server can be started, and database application and users served, and all updates to the database can be captured and indexed (backed up), while recovery is going on simultaneously.

In step 6012 after the database server is started, the DMS host driver preferably performs duo-stream processing. In the background, the DMS host driver recovers segments of the recovering files or volumes sequentially by retrieving the most recent data (note that the data state in the DMS is adjusted such that the most recent state is the recovered state) from the DMS. As segments are recovered, the corresponding cells in the recovery bitmap are turned ON.

Figure 22:
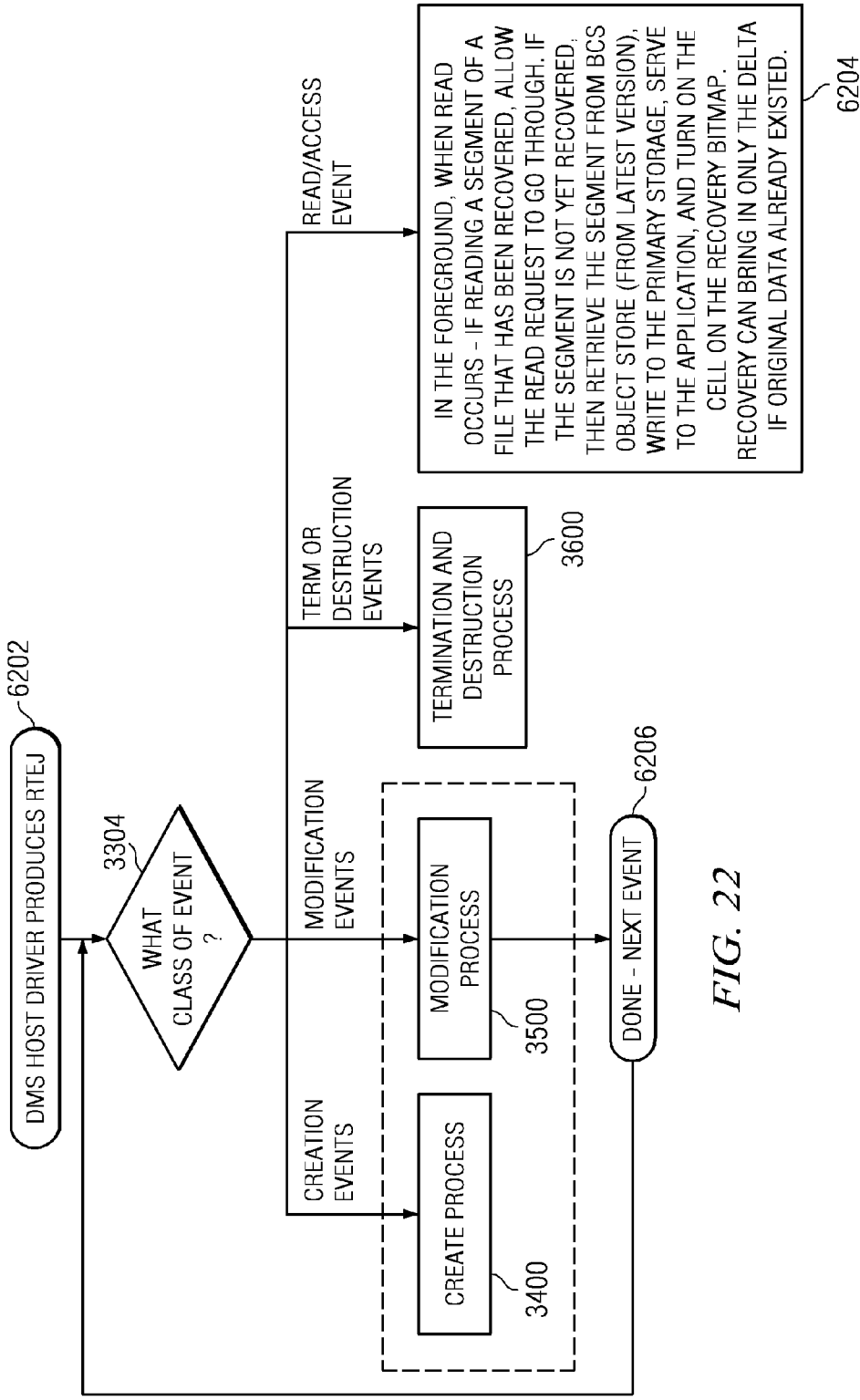
FIG. 22 illustrates real-time event journal processing of a database during virtual-on-demand recovery (VODR).

Simultaneously, in the foreground, in step 6012, a real-time event journal process (as illustrated in FIG. 22) for simultaneous database backup and recovery is executing until all the cells in the recovery bitmaps are ON. At which point, the database or the server is fully recovered. Once, fully recovered, at step 6014, the DMS host driver returns to regular backup mode.

FIG. 22 is a flow diagram illustrating the DMS real-time event journal processing of a database server during its virtual-on-demand recovery phase. In this phase, the database is simultaneously being recovered and protected (backed up). This DMS real-time event journal process is similar to that illustrated in FIG. 14, except that during this recovery phase, all the READ (i.e. access events and requests) are intercepted by the DMS host driver and processed in 6204. When a READ is requested by the database, the DMS host driver lookup the associated recovery bitmap cell. If the cell is ON, it indicates that the segment of the requested data is already recovered to the primary storage, in which case, the DMS host driver allows the request to go through. If the cell is OFF, the DMS host driver fetches the segment of data from the DMS object store, writes it to the recovering storage, and serves it to the database. Note that if a corrupted recovering file existed, the DMS host driver needs only to fetch the delta, and not the entire segment. The dirty bitmap is used for tracking the binary and control file modification. This real-time event journal process (FIG. 22) keeps going on until all the cells in the recovery bitmap are turned ON.

As noted above, the technique described herein may be combined with virtual-on-demand recovery, and DMS host driver automated, no-down time (finite state machine) data upload and protection. The DMS provides a significantly no downtime data protection services with near instantaneous, and guaranteed usable data recovery to a database application.

While the present invention has been described in the context of a method or process, the present invention also relates to apparatus for performing the operations herein. In an illustrated embodiment, the apparatus is implemented as a processor and associated program code that implements a finite state machine with a plurality of states and to effect transitions between the states. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows.

What is claimed is:

1. A data management method, comprising:
capturing, in real time, complete record changes of a database-system data source along a single data path;
wherein an actual change order of the complete record changes is preserved;
wherein changes to new volumes are captured;
receiving from the database-system data source, as a real-time continuous history of the database-system data source, a real-time event journal;
storing in a data store the real-time continuous history of the database-system data source as a logical representation, wherein consistent checkpoint images of different database versions, real-time event journal versions, and database transactions are stored in association with time stamps indicating when the database versions and journal versions were created and when the transactions occurred; and
using the logical representation for any point-in-time recovery of a data set of the database-system data source, wherein the any point-in-time recovery includes:
choosing a desired point-in-time to which to recover the data set;
identifying, using a first level of indexing that tracks consistent database versions, a closest database version that was created right before the desired point-in-time;
identifying, using a second level of indexing that tracks real-time event journal versions between the consistent database checkpoints, a closest real-time event journal version that was created after the closest database version and right before the desired point-in-time;
identifying, using a third level of indexing that tracks database transactions between the real-time event journal versions, a list of database transactions that occurred after the closest real-time event journal version and before the desired point-in-time; and
restoring the closest database version, restoring the closest real-time event journal version, and rolling forward the database state to the desired point-in-time using the identified list of database transactions.

2. The method as described in claim 1 wherein the data set of the database-system data source comprises data from one or more databases.

3. The method as described in claim 1 wherein the any point-in-time recovery provides recovery with consistency and integrity of one or more database files belonging to a database, where files are versioned at a checkpoint event.

4. The method as described in claim 1 wherein the any point-in-time recovery provides recovery with consistency and integrity of multiple databases each of which are aligned at a checkpoint event.

5. The method as described in claim 1 wherein the any point-in-time recovery provide recovery with consistency and integrity of one or more of database binary files belong to one database with the files versioned at a checkpoint event prior to a recover point-in-time, and one or more database log files belong to the same database with transaction records up to the recover point-in-time.

6. The method as described in claim 5 wherein the any point-in-time recovery provides recovery with guaranteed consistency across multiple databases of the database-system data source, where each database of the multiple databases has one or more volumes.

7. The method as described in claim 1 wherein the any point-in-time recovery provides recovery with consistency and integrity of one or more database volumes that belong to a database, where volume data of the one or more database volumes is versioned at a checkpoint event.

8. The method as described in claim 1 wherein the any point-in-time recovery provides recovery with consistency and integrity of one or more database binary volumes that belong to a database, where the one or more database binary volumes are versioned at a checkpoint event prior to a recover point-in-time, and one or more database log volumes belong to the database with transaction records of the one or more database log volumes up to the recover point-in-time.

9. The method as described in claim 1 wherein the point in-time is when an event occurs in a timeline.

10. The method as described in claim 8 wherein the checkpoint event is one of: a database event, a user tag, a system event, a network event, and a security event.

11. The method as described in claim 1, wherein recovery includes:
creating a hierarchical data structure of recovering data;
filling content of files or volumes;
allowing a database service to be started instantaneously; and paging data on demand as requested by the database-system data source.

12. The method as described in claim 1 wherein the capturing is performed using a finite state machine.

13. The method as described in claim 1 wherein the data store is remote from the database-system data source.

14. The method as described in claim 1, wherein the received real-time event journal comprises:
- transaction data;
- binary data changes;
- metadata; and
- events.

15. A computer-program product comprising a non-transitory computer-usable medium having computer-readable program code embodied therein, the computer-readable program code adapted to be executed to implement a method comprising:
- capturing, in real time, complete record changes of a database-system data source along a single data path;
- wherein an actual change order of the complete record changes is preserved;
- wherein changes to new volumes are captured;
- receiving from the database-system data source, as a real-time continuous history of the database-system data source, a real-time event journal;
- storing in a data store the real-time continuous history of the database-system data source as a logical representation, wherein consistent checkpoint images of different database versions, real-time event journal versions, and database transactions are stored in association with time stamps indicating when the database versions and journal versions were created and when the transactions occurred; and
- using the logical representation for any point-in-time recovery of a data set of the database-system data source, wherein the any point-in-time recovery includes:
  - choosing a desired point-in-time to which to recover the data set;
  - identifying, using a first level of indexing that tracks consistent database versions, a closest database version that was created right before the desired point-in-time;
  - identifying, using a second level of indexing that tracks real-time event journal versions between the consistent database checkpoints, a closest real-time event journal version that was created after the closest database version and right before the desired point-in-time;
  - identifying, using a third level of indexing that tracks database transactions between the real-time event journal versions, a list of database transactions that occurred after the closest real-time event journal version and before the desired point-in-time; and
  - restoring the closest database version, restoring the closest real-time event journal version, and rolling forward the database state to the desired point-in-time using the identified list of database transactions.

* * * * *